Oct. 29, 1963  A. JAZBUTIS ETAL  3,108,384
TRAINING AND TESTING DEVICE
Filed Feb. 1, 1961  15 Sheets-Sheet 1
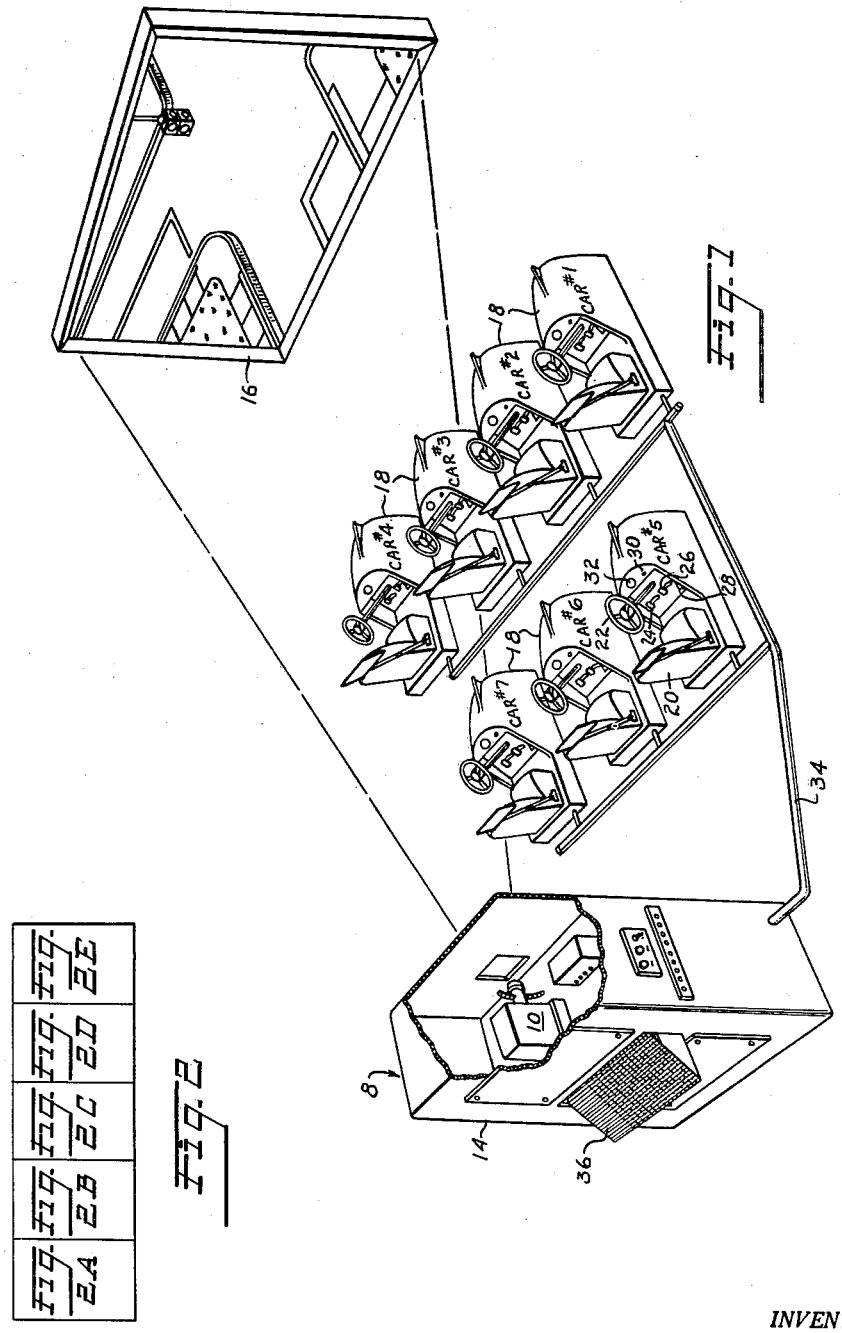
INVENTORS
ANATOLIJUS JAZBUTIS
BY PHILIP B. CROMMELIN
Strauch, Nolan & Neale
ATTORNEYS Oct. 29, 1963　　　A. JAZBUTIS ETAL　　　3,108,384
TRAINING AND TESTING DEVICE
Filed Feb. 1, 1961　　　　15 Sheets-Sheet 2

*Individual Car Scores*

Fig. 1A

INVENTOR
ANATOLIJUS JAZBUTIS
PHILIP B. CROMMELIN

BY Strauch, Nolan & Neale
ATTORNEYS

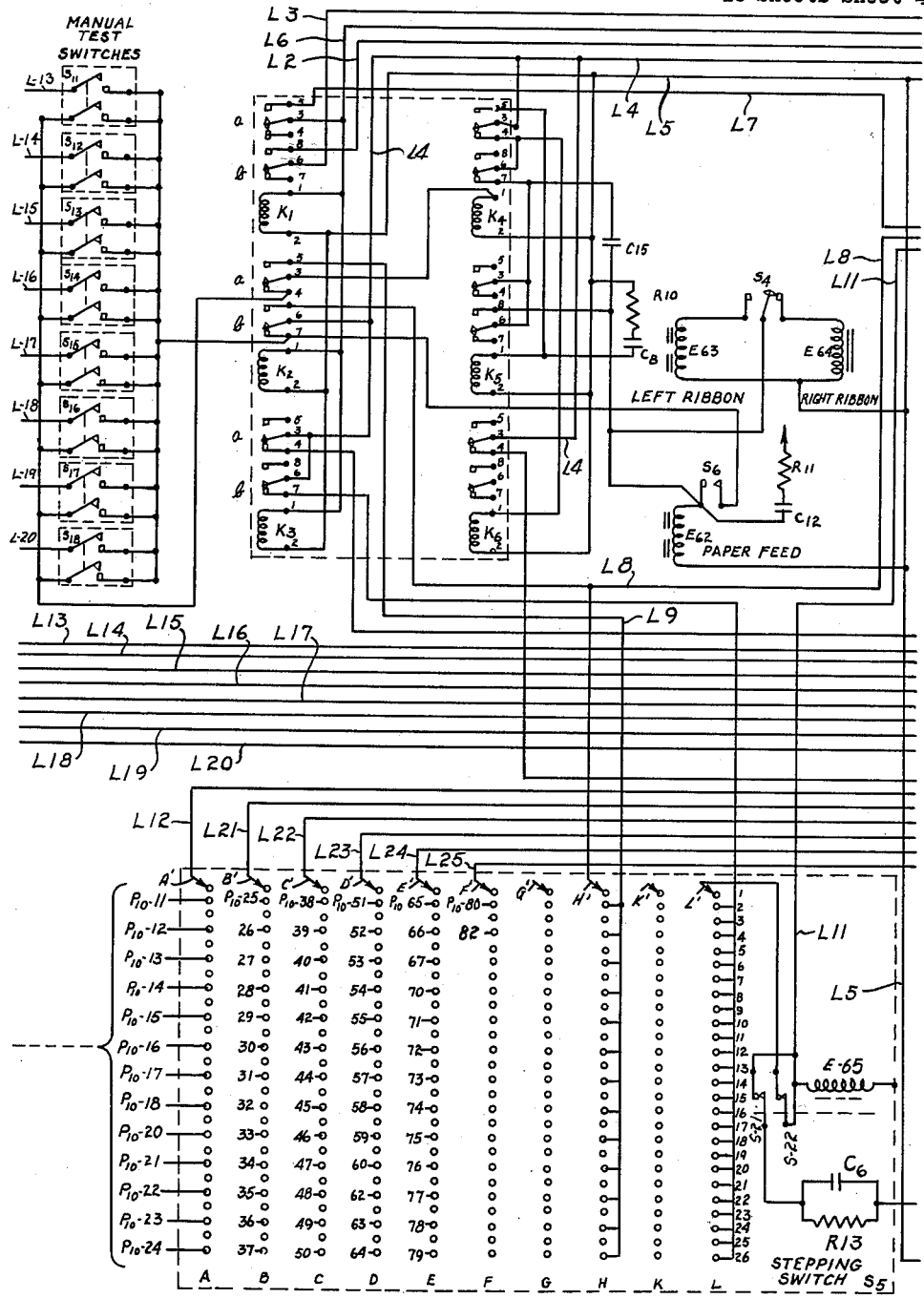

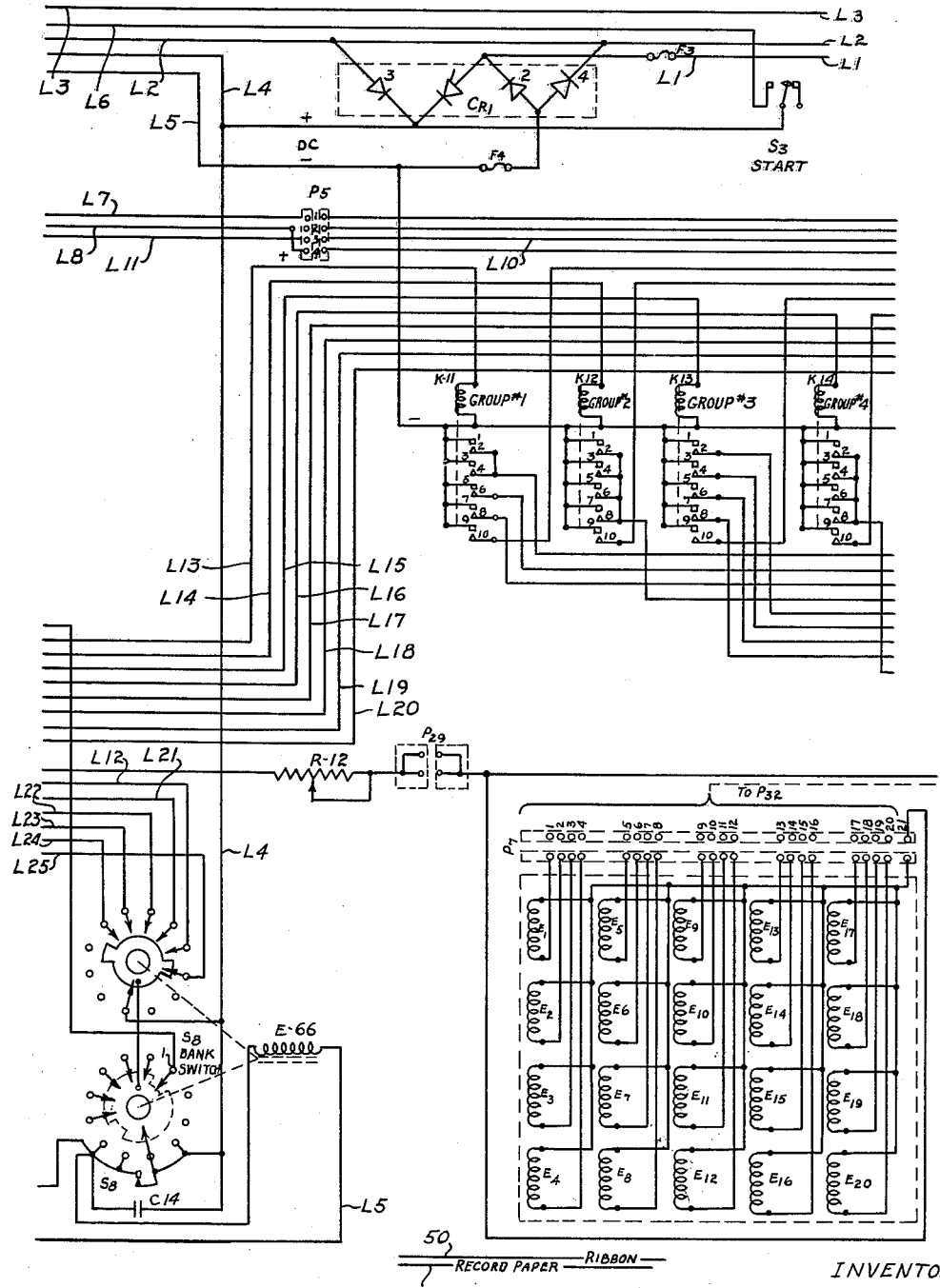

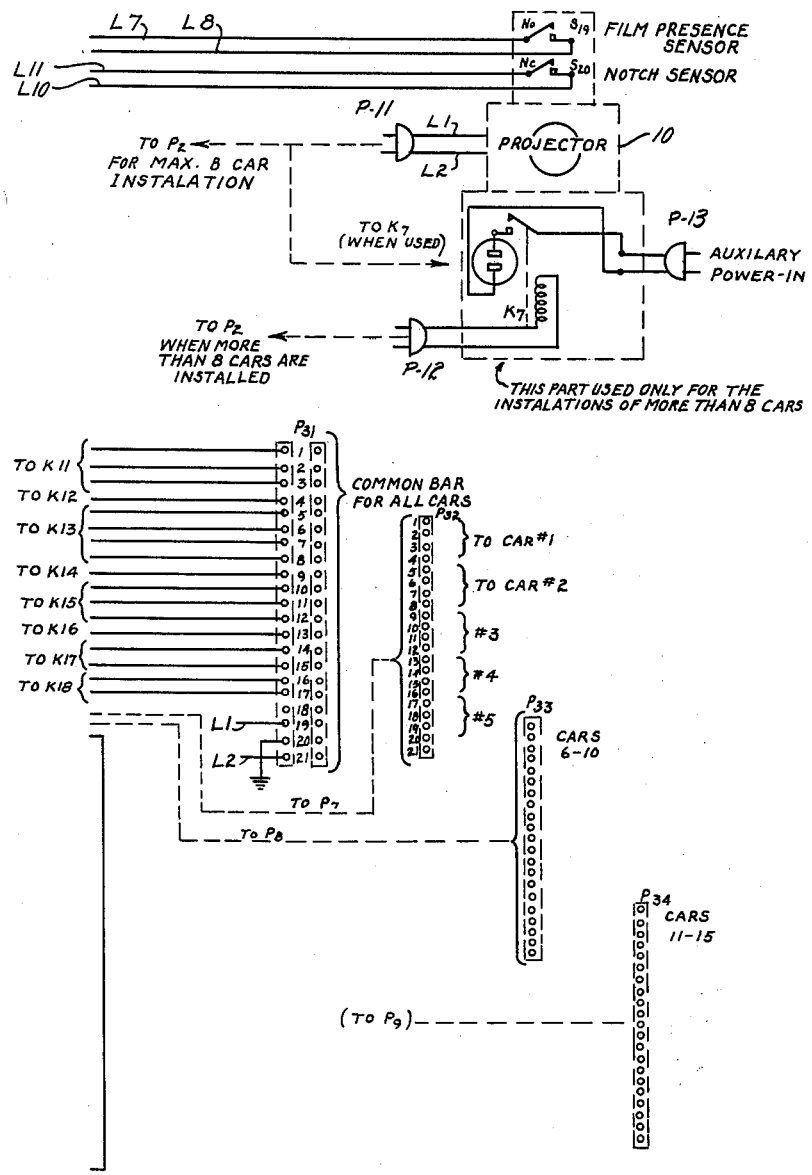

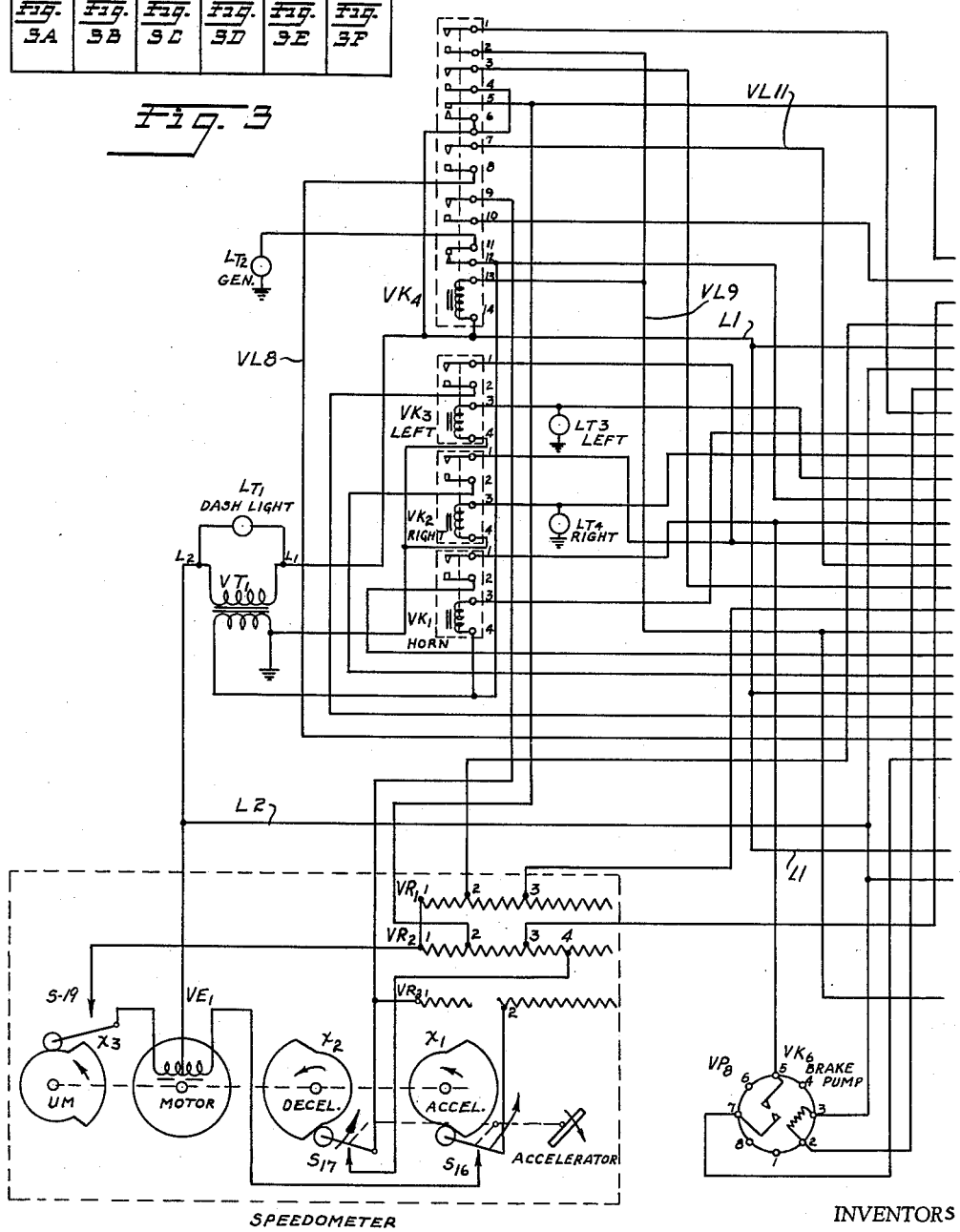

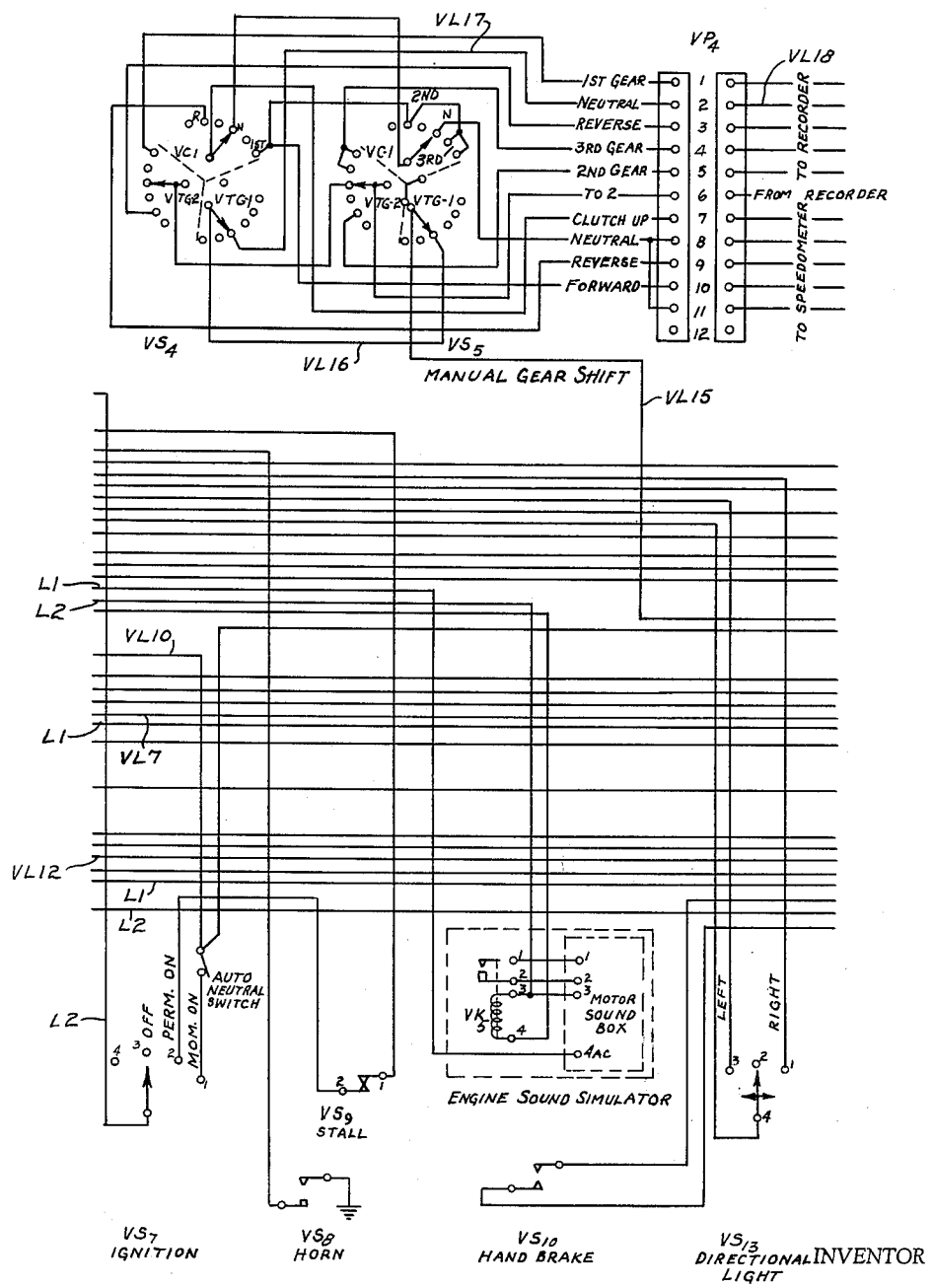

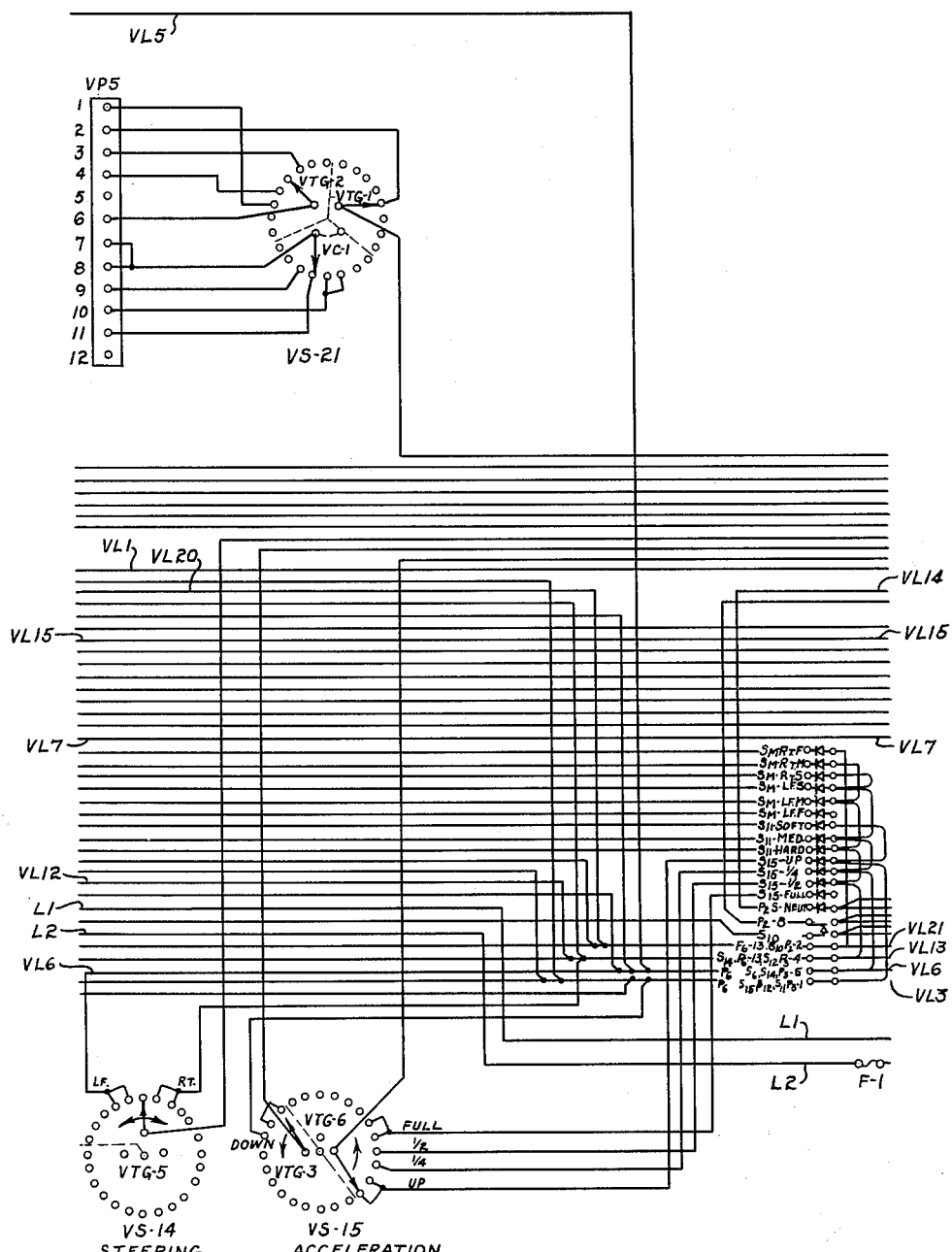

INVENTORS
ANATOLIJUS JAZBUTIS
PHILIP B. CROMMELIN

BY Strauch, Nolan & Neale

ATTORNEYS

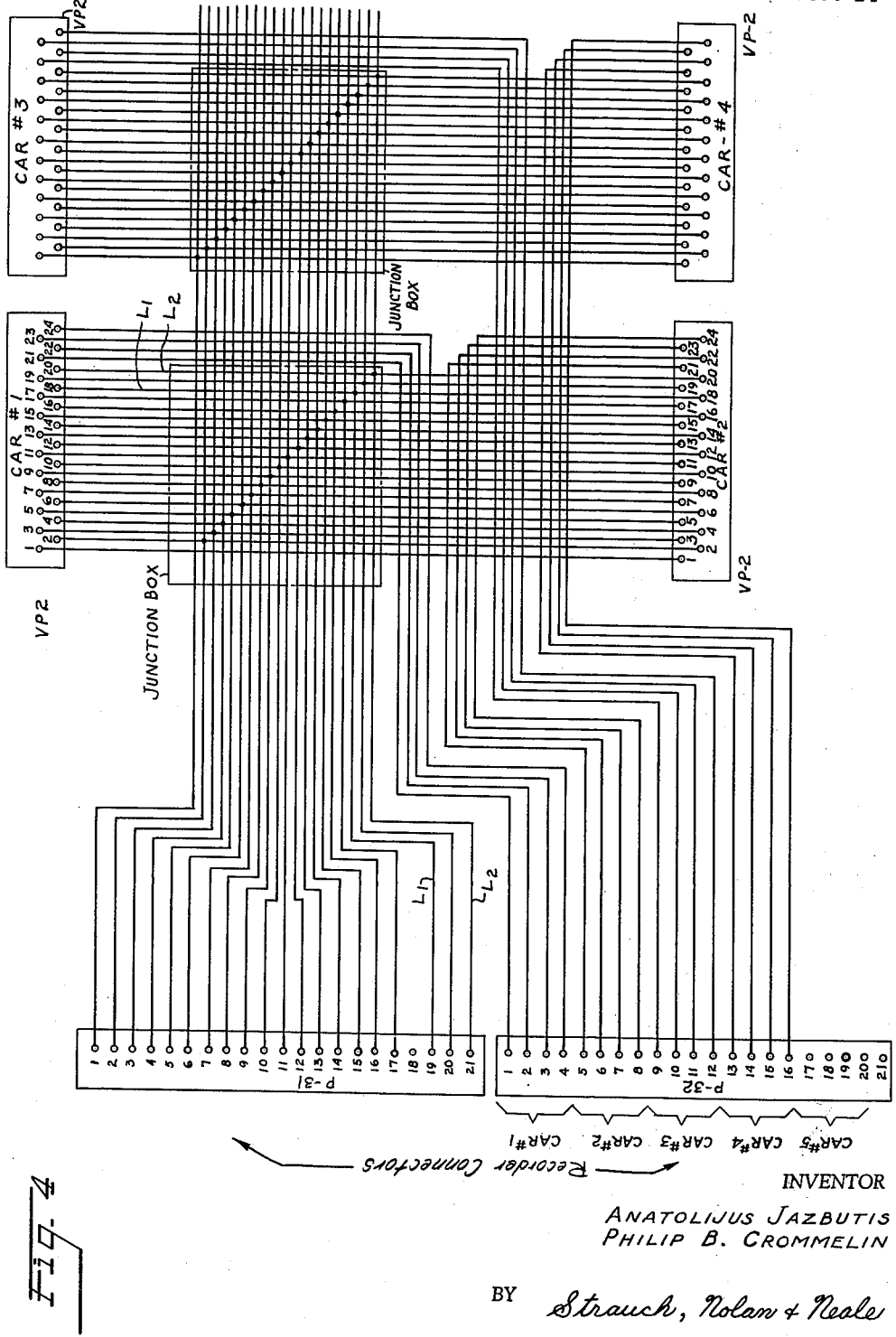

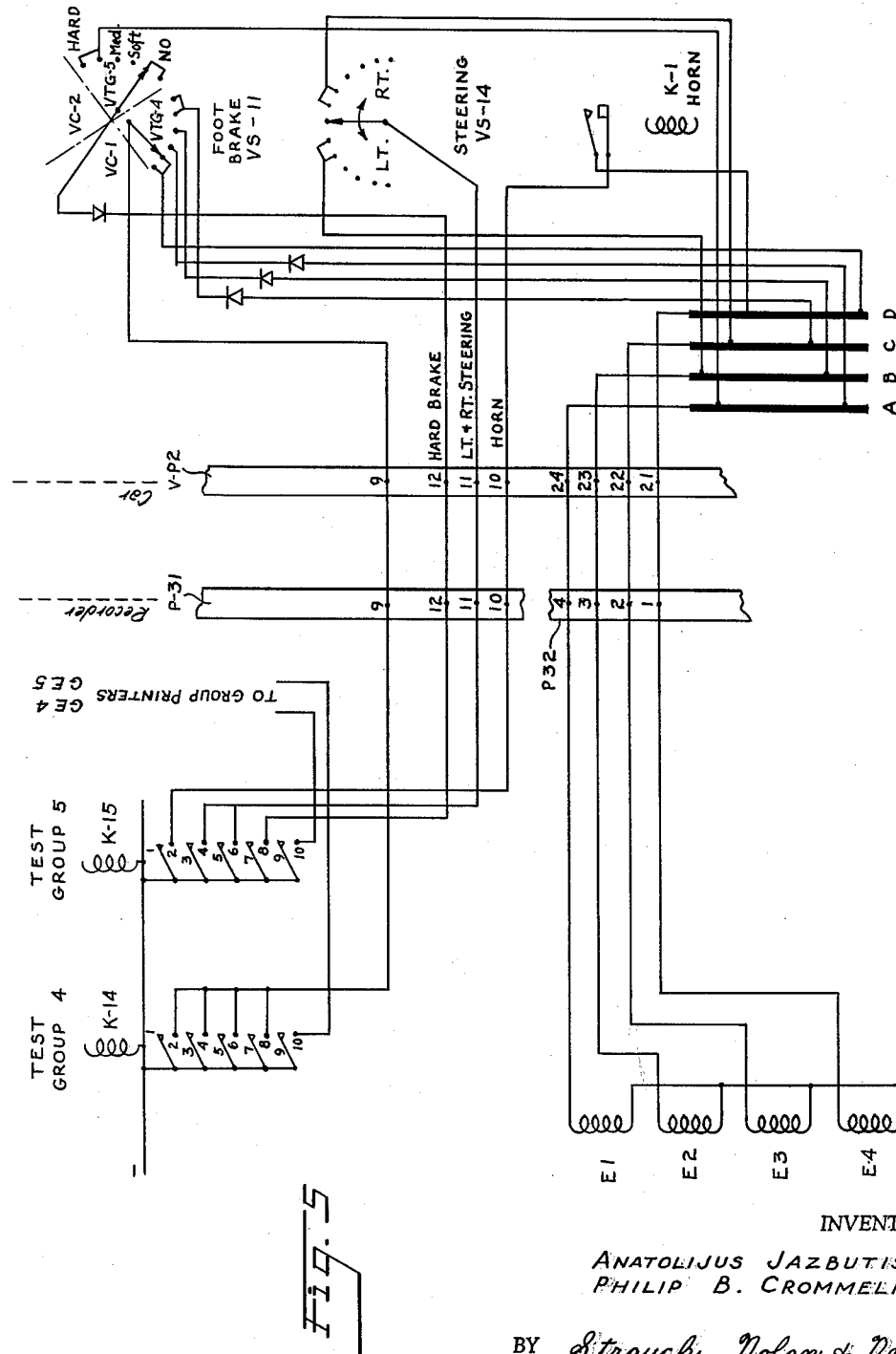

United States Patent Office 3,108,384
Patented Oct. 29, 1963

3,108,384
TRAINING AND TESTING DEVICE
Anatolijus Jazbutis and Philip B. Crommelin, Jamestown, N.Y., assignors to Rockwell Manufacturing Company, Pittsburgh, Pa., a corporation of Pennsylvania
Filed Feb. 1, 1961, Ser. No. 86,523
13 Claims. (Cl. 35—11)

The present invention relates to improvements in vehicle operator training and testing devices and more particularly to improvements in devices for training and testing operators of automotive road vehicles.

In general, the apparatus of the present invention comprises a central recording and control unit and a plurality of individual control positions or units, interconnected so that selective operation of the controls of the individual control units in response to stimuli presented in series from the central control unit, the individual controls being selectively conditioned for effective operation from the central control unit, causes a corresponding record to be made, preferably at the central control unit, showing the manner in which the appropriate control at each individual unit was operated and preferably whether or not it was operated correctly or in accordance with a predetermined standard.

The central control unit preferably includes a stimulus generator, such as a motion picture projector to project a moving picture on a screen in front of the individuals to be tested, and the film projected includes a predetermined series of stimuli such as the various traffic hazards and incidents which might be encountered in travel on a highway, or may be verbal instructions demanding the use of control members in a particular manner, and at a particular time. Thus, in a projected sequence showing automobile travel along a street, a traffic light may change from green to red requiring a stop, or from red to green requiring the starting of the vehicle; the road may curve requiring steering; in starting clutch, accelerator and gear shifting operations are required; in shifting proper sequence of clutch, accelerator and gear shift lever are required; in stopping, the brake should not be applied too hard; in turning, the directional signal should be used; some occasions may require use of the horn, and on completing the sequence, the ignition switch should be locked and the brake set. A short or prolonged and varied sequence of such operation and others in a natural manner may well be presented by a motion picture whose scenes impliedly require certain of these operations or the actions may be called for by verbal (oral or visually projected) directions.

At the central control unit are conditioning switches which may be manually or automatically operated to initiate the test period. Where the switches are to be automatically operated, they are preferably conditioned from the film and in coordinate relation to the portions of the film then being projected, and preferably by means of a switch actuated from the film itself, as by notches in the edge thereof or a photo-electric signal, as programmed by the programming plug (FIGURE 2A) will select one of the eight test groups to be tested.

The central control unit is preferably positioned at one side of a classroom, and the projection screen at the opposite side thereof, with the several students or individuals to be tested at their respective control positions therebetween and oriented to face the screen, the several control positions being electrically connected with the central control unit and with the recording unit.

Each of the individual control positions preferably comprises a definite location for each of the persons to be trained or tested, and a group of control members to be actuated by the person in response to the stimuli observed or received by him. Where automobile driving is being taught or tested, each of the control positions may comprise a driver's seat, a steering wheel, a brake pedal, an accelerator, a parking brake lever, a horn switch, a clutch pedal and a gear shift lever. Other less essential parts may be included such as an "ignition" switch, speedometer, directional signal switch, starter switch, and the like, depending on what equipment is usually provided in an ordinary vehicle and is desired to be taught or tested as to its operation by the subjects.

Such individual control positions or units may be used in a group of any desired number, but as many as 20 to 30 such units may be conveniently used with a single screen on which the series of stimuli are presented from the projector of the central control unit, in a room of conventional size such as 20' by 30', allowing ample spacing of the units and the screen from all of the units.

Also preferably included in each of the individual control units are switches or other signal producing devices to be actuated on operation of each of the control members. The steering wheel is preferably provided with switches responsive to whether it is turned to the right or left and the magnitude of turn, or is allowed to remain in a straight-ahead position. The brake pedal operates on a switch on being depressed, and a second switch to be operated if the brake pedal is depressed fully or violently. The accelerator pedal controls the speed of a small motor, which is loaded to closely follow the action of the accelerator pedal, and the clutch pedal simulates control of the load applied to the motor, while speed responsive switches controlled by the motor and the clutch pedal respond to the coordinated operation of the accelerator and clutch pedal, while the speedometer is driven according to the operation of the motor.

Preferably, an engine sound simulator creates a variable frequency audible sound indicative of the speed of the engine under control of the accelerator, clutch and brake as with a conventional motor vehicle.

The steering wheel is preferably biased to return to a normal or straight ahead position, and is loaded so that the further it is turned the greater is the resistance to its turning.

The clutch pedal, when used, is provided with means for changing the feel of the pedal depending on the rate at which it is moved from disengaged position to an initial engaging position, and from the initial engaging position to fully engaged position; and with switches actuated on full engagement, full disengagement and the rate of movement at the time of the initial engagement movement.

The directional signal control preferably comprises switches selectively actuated by movement of the signal control to the right or to the left.

The brake pedal is preferably adapted to control a plurality of switches depending on the position of the brake pedal corresponding to positions of normal or emergency (full) application and to released position.

A parking brake is also provided with switches selectively actuated in accordance with whether it is set or released.

A gear shift lever is adapted to control switches selectively distinguishing between the several positions of the lever, such as reverse, neutral, low, second and high ratio positions.

Some or all of the switches are connected through conductors and relays to actuate measuring and/or recording parts, which are conveniently and illustratively positioned at and form part of the central control unit.

Such measuring and recording parts are preferably those required to produce a record of the response of each individual to the several stimuli presented and the concomitant conditioning of the various circuits.

The measuring and recording mechanism provides means for feeding a record member or sheet, and means for recording thereon the individual responses of the several subjects to the series of stimuli, preferably on different portions of the record sheet so that the response of each subject to each stimulus can be identified.

As embodied, the record sheet comprises a relatively large sheet divided into a number of columns each of which corresponds to a particular subject, while along the column are provided spaces for the record of the subject's responses to each of the several stimuli of the series. Thus the record sheet, when completed, may be scanned in one direction to learn what was done by all of the individuals in response to a particular stimulus, and in the other direction to learn how an individual subject responds to the entire series.

The feed mechanism is preferably operated once for each stimulus, and conveniently one or more indicia are recorded on the record which may be coded so that a group of indicia show which of the controls were operated, the manner in which they were operated or whether or not the appropriate control was operated within a given period. For example, one, two, three or all of four indicia may be recorded, each showing a particular operation, or a combination of them showing correct or incorrect operation of a particular control or a set of controls at a particular time.

The measuring and recording apparatus is exemplarily adapted to print four indicia at each stimulus response, and the four indicia form a record of four different factors which are involved in the correct response to a particular stimulus, while on the next stimulus the same four indicia may indicate the correctness of the response with other control members or combinations thereof to the entirely different factors involved.

In the central control unit are preferably provided a plurality of conditioning switches for manual operation, which may be used to condition the various circuits so that particular responses may be called for and recorded in arbitrary sequences and without operation of the projector. In this manner of operation, the oral directions of the instructor form the stimuli to which the student is expected to respond.

Examples of the devices of this general type developed heretofore are disclosed in United States Letters Patent No. 2,269,444, issued January 13, 1942, to H. N. Durham et al. for Testing Device, Patent No. 2,273,091, issued February 17, 1942, to H. R. De Silva for Apparatus for Ascertaining a Subject's Behavior When Operating a Motor Vehicle, and Patent No. 2,870,548, issued January 27, 1959, to C. Chedister for Driver Training and Testing Equipment.

In prior devices of this type it has been found necessary to provide a separate actuator for rendering operable for recording the control instrumentality indicator switches of each simulated vehicle. When large numbers of simulated vehicles are used, the number of actuators increases in direct proportion to the number of simulated vehicles. This is true whether the actuators are located in the control unit in accord with prior commercial practice or in the individual simulated vehicles as in the aforesaid Chedister patent. When the actuators are located in the control unit, the number of interconnections from the control unit to the simulated vehicles increases even more. When the actuators are located in the individual simulated vehicles, there has been a lack of flexibility in the sequence of activation of the actuators. When the actuators are located in the control unit, it is necessary to in effect, tailor make each control unit for the number of simulated vehicles to be used with it. For example, if a control unit is designed in accord with prior commercial practice for use with five simulated vehicles it has five actuators, each with approximately twenty connections to the associated simulated vehicle. If it is later decided to use this control unit with ten more simulated vehicles, five additional actuators are necessary and one hundred additional interconnections are required.

The principal object of this invention is to provide an improved vehicle operator training and testing device in which an actuator is provided for each type of control instrumentality or for each functionally correlated group of control instrumentality types and in which each actuator is connected to activate, when operated, the indicator switches of the like instrumentalities of all simulated vehicles.

A further object of this invention is to provide a vehicle operated training and testing device embodying a plurality of simulated vehicles each having a like set of distinct operator manipulatable vehicle control instrumentalities each provided with a normally in-operative indicator, a series of actuators each connected to activate, when operative, like instrumentality indicators in each simulated vehicle, and a selectively variable control unit for determining the sequence of operation of the actuator.

These and other objects of the present invention will become more fully apparent by reference to the appended claims and as the following detailed description proceeds in reference to the accompanying drawings wherein:

FIGURE 1 is a diagrammatic illustration of the vehicle operator training and testing device of the present invention;

FIGURE 1A is an illustration of a record sheet adapted for use with the device of FIGURE 1;

Figure 2A:
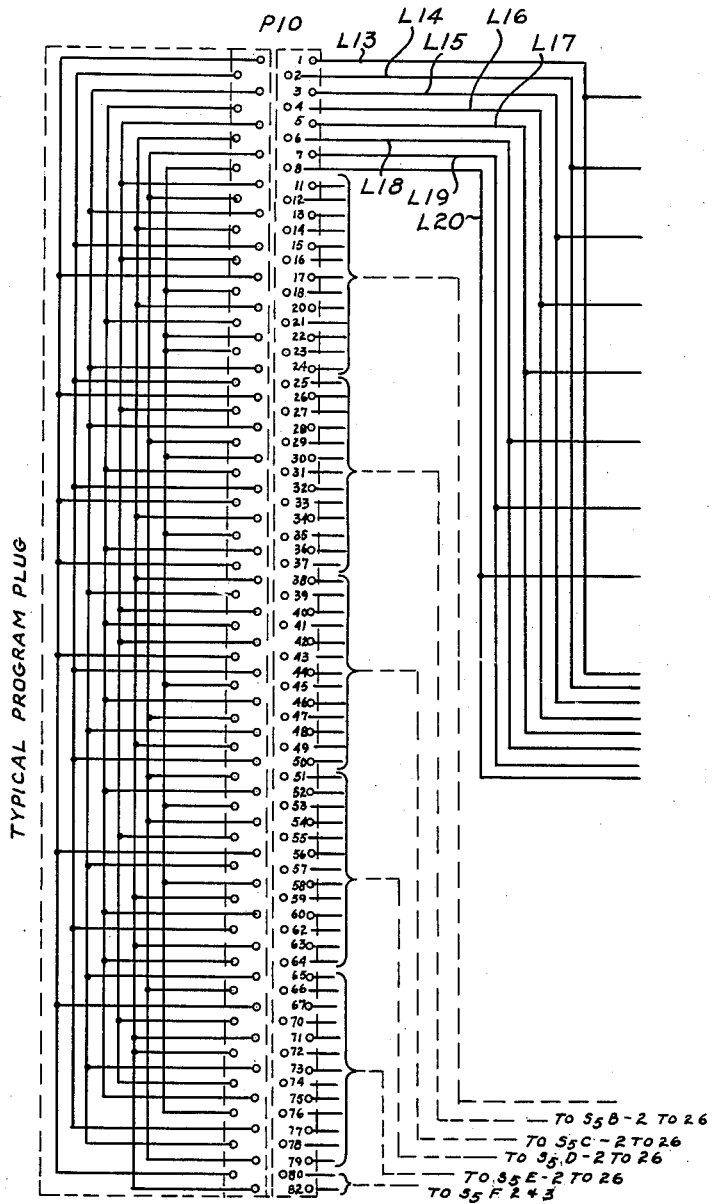
FIGURE 2 is a diagram illustrating the relationship of FIGURES 2A–2E.
Figure 2D:
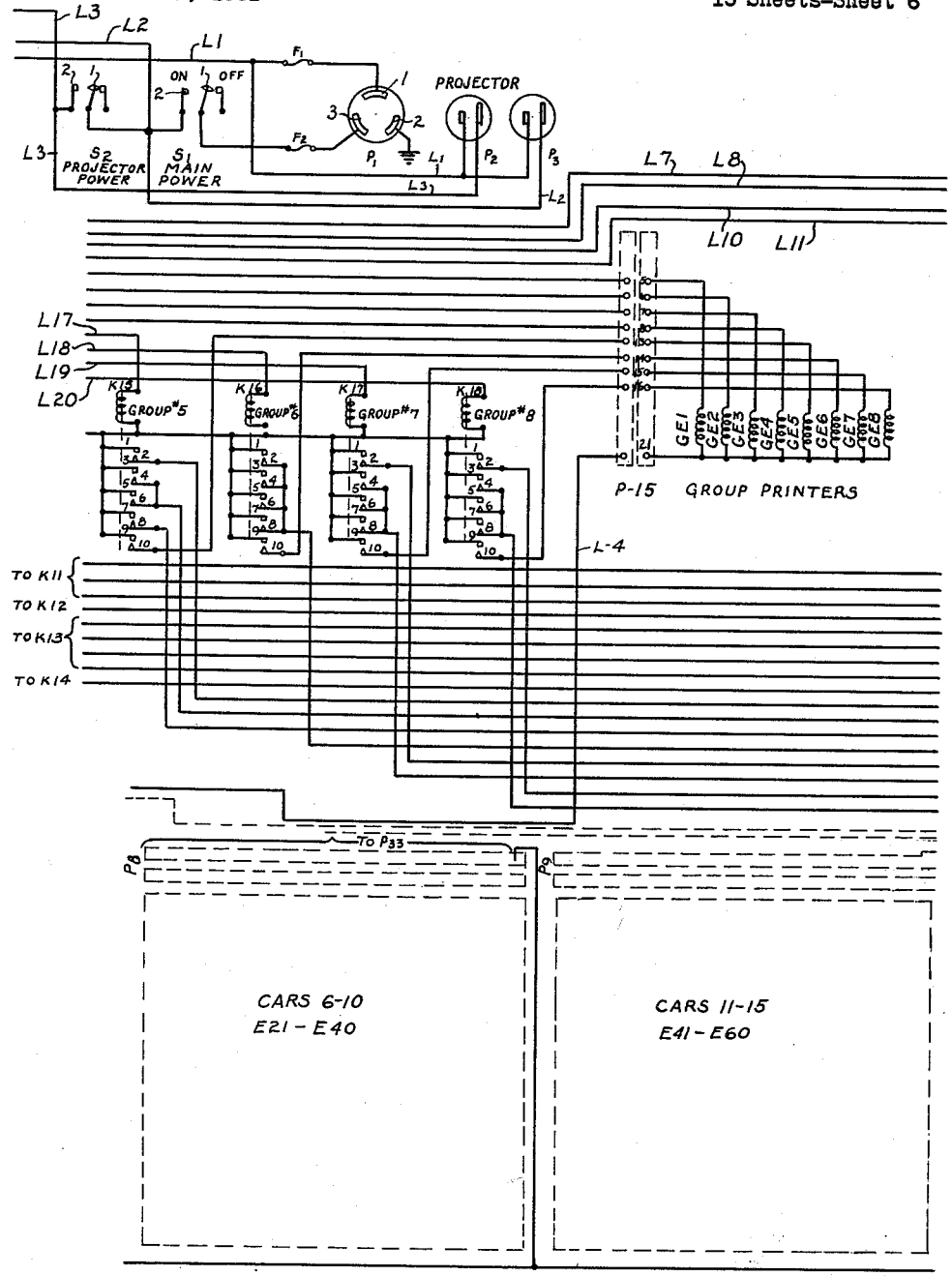
Figure 3B:
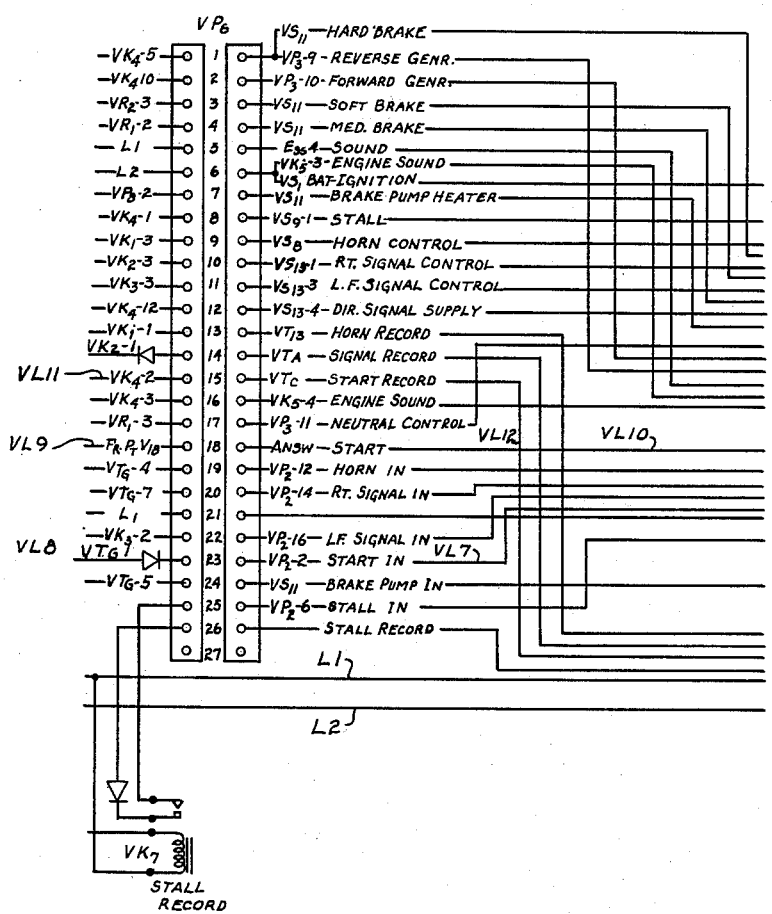
Figure 3D:
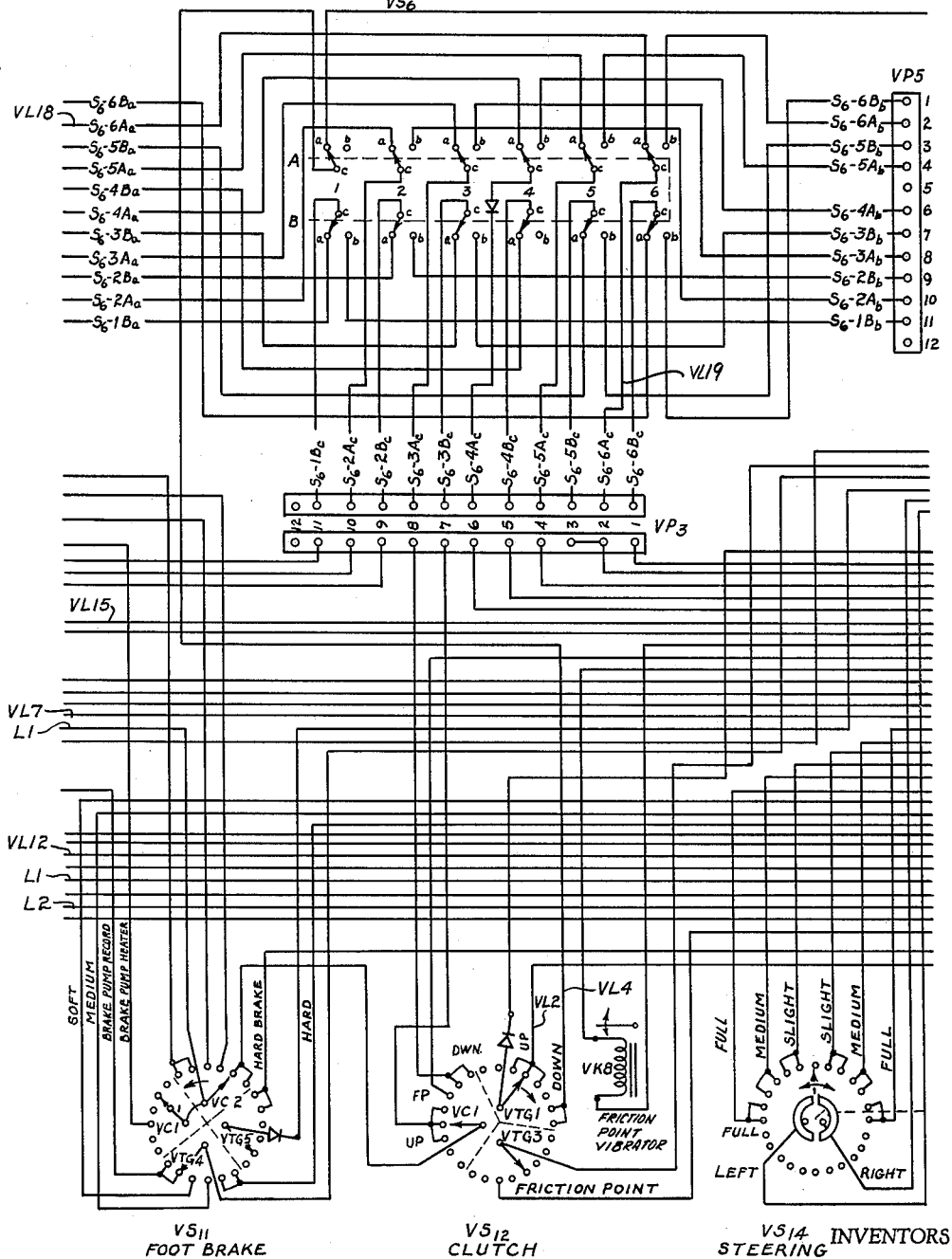
Figure 3F:
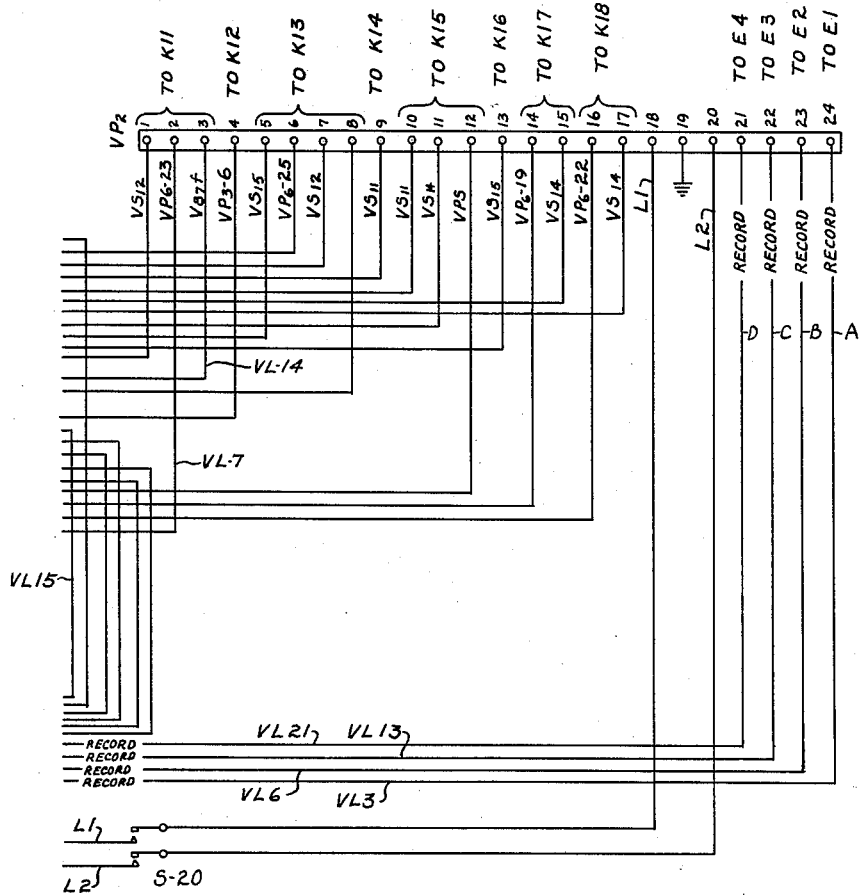

FIGURES 2A–2E, when assembled as illustrated in FIGURE 2, are a schematic diagram of the control unit circuitry of the present invention;

FIGURE 3 is a diagram illustrating the relationship of FIGURES 3A–3F;

FIGURES 3A–3F, when assembled as illustrated in FIGURE 3, are a schematic diagram of the circuitry of each of the simulated vehicles;

FIGURE 4 is a diagram illustrating the interconnections between the control unit of FIGURES 2A–2E to a plurality of simulated vehicles each having circuitry as illustrated in FIGURES 3A–3F;

FIGURE 5 is a simplified schematic diagram illustrating the recording circuitry.

Between the control unit 8 and the screen 16 are located a plurality of simulated vehicles 18 designated "Car No. 1," "Car No. 2," . . . "Car No. 7." Each simulated vehicle 18 is provided with a seat 20 and set of operator manipulatable vehicle control instrumentalities such as steering wheel 22, clutch pedal 24, foot brake pedal 26, accelerator pedal 28, ignition switch 30, etc. and a speedometer 32. The simulated vehicles 18 have identical circuitry in the form illustrated in FIGURES 3A–3F and are each connected to control unit 8 through a multiple wire connecting cable 34, the details of which are illustrated in FIGURE 4. The control unit, the circuitry of which is illustrated in FIGURES 2A–2E, is provided with a plurality of recorders E1–E60 (FIGURES 2C and 2D).

As illustratively shown in FIGURE 1, the control unit 8 comprises a motion picture projector 10 suitably mounted in a casing 14 and adapted to project images on a screen 16 which may be some 15 feet from the projector and often as far as 50 feet or more. The projector 10 and the screen 16 are preferably arranged adjacent to opposite sides of a room which is otherwise dimly lighted.

The motion picture projector 10 may be a continuous projector so that the film may be repeatedly projected without rewinding. Such a film preferably includes a sequence of incidents which follow each other in a logical order such as putting an automobile in motion on a highway followed by turning corners, traffic lights, pedestrians, stopping, etc. or in a more elementary series of starting the motor, releasing the parking brake, depressing the clutch, shifting into gear and eventually into high with the coordinated actuation of the accelerator, and eventually stopping. Using the control members or instrumentalities provided and relating these to normal driving conditions a wide variety of incidents may be used and combined in different orders, to present the majority of traffic incidents on the screen.

The projector 10 is preferably a motion picture film projector and passage of the film through the projector preferably causes actuation of various control circuits conditioning various selected control members to be actuated by each of the subjects viewing the projected picture, different portions of the film causing conditioning of different selected controls or combinations of controls, preferably related to the motion picture projected by the projector.

Other control circuit conditioning means are preferably provided for arbitrary manual operation by the instructor so that incidents may be repeated ad infinitum or presented in irregular, changing or any desired sequence.

The three illustrated groups of recorders E1 to E20, E21 to E40 and E41 to E60 may be conveniently arranged in five banks of four each, although these numbers are illustrative only and more or fewer banks each of more or less than four may be used in the same manner. The several recorders for each individual subject, such as E1 to E4, are preferably alined with each other so that they may all print in a single vertical column on the record sheet 36 (FIGURE 1A), one such column being provided for each individual subject.

Each of the recorders E1 to E60 preferably comprises a solenoid having an armature (not shown) movable upon energization of the coil thereof by electro-magnetic force into contact with the sheet of paper 36 (FIGURES 1A and 2C) and normally held retracted from the paper 36, as by a spring (not shown), the end of the armature adjacent the paper engaging a marking member, such as inked ribbon 50 (FIGURE 2C) as to make a spot on the paper 36 as the sheet is supported on a flat surface.

As is illustrated in FIGURE 1A, the record sheet comprises a sheet of paper 36 which may conveniently be backed by a second or duplicate sheet in register therewith, sheet 36 being printed with carbon or transfer compound on its undersurface. Each of the sheets 36 is divided into a number of vertical columns, one for each of the individual control positions and provided with horizontal columns in groups of four for each of the several tests to be performed. Thus, for example, there may be eight tests recorded on a single record sheet 36, with four possible record indicia for each car for each test, or thirty two horizontal columns, divided into twenty-five vertical columns, one for each of twenty-five subjects or pupils. At one side margin of the sheets may be printed a series of numbers, 1 through 8, for example, one for each possible test group together with a blank square beside each number. When a particular test group is selected either automatically or manually a mark is recorded in the block beside the number of the test group selected by actuation of one of the group recorder solenoids GE1 to GE8 (FIGURE 2D). In this manner, a code indicating test group and hence the function of the record is imprinted.

RECORDER OPERATION (MANUAL)

Referring to FIGURES 2A to 2E, electrical power is supplied to the control unit circuit therein illustrated through pins 1 and 3 of a power input plug P1 (FIGURE 2D). Pin 1 of plug P1 is connected directly to line L1 through a fuse F1 and pin 3 of plug P1 is adapted to be connected through a fuse F2 and contacts 1 and 2 of the main power switch S1, when closed, to the line L2. For manual operation of the equipment, the projector plug P11 (FIGURE 2E) is plugged into plug P3 (FIGURE 2D). Lines L1 and L2 are connected to the projector connection plug to supply alternating current power to the projector 10 as soon as switch S1 is closed.

Line L2 is connected to the junction of rectifiers 3 and 4 (FIGURE 2C) of the rectifier bridge circuit CR1 and line L1 is connected to the junction of the rectifiers 1 and 2 of the rectifier bridge circuit CR1. Positive direct current potential is thus made available on the line L4 which is connected to the junction of rectifiers 1 and 3 of the bridge circuit CR1 and negative direct current potential is available on line L5 which is connected through fuse F4 to the junction of rectifiers 2 and 4 of the bridge circuit CR1.

With the main power switch S1 closed and the start switch S3 open the equipment is operative for manual operation under control of manual test switches S11 to S18 (FIGURE 2B). In this mode of operation any of the eight test groups are selected by manual depression of manual test switches S11 to S18. In this manual operation, stepping switch S5 (FIGURE 2B), bank S8 (FIGURE 2C), and the programming plug associated with plug P10 (FIGURE 2A) are not used. At the discretion of driving instructor, any one of the manual switches S11 to S18 (FIGURE 2B) will be operated. Switches S11 to S18 control the energization of group test relays K11 to K18 respectively (FIGURES 2C and 2D) and of group printer solenoids GE1 to GE8 respectively. For illustrative purposes assume that switch S14 is depressed. It should be noted that in the manual operation, start switch S3 was not activated and hence relays K1, K2 and K3 are not energized. The positive voltage appearing on line L4 will be transmitted through the normally closed contacts 6 and 7 of relay K2 to one side of the manual test switches S11 to S18 in common. The closing of contacts A of switch S14 will transmit the positive voltage on line L4 to the line L16 (FIGURES 2A, 2B and 2C) and thereby activate the relay K14 (FIGURE 2C) of the test group No. 4, the other side of which is connected to negative line L5. The closure of contacts 9 and 10 of relay K14 will energize group printer coil GE4 (FIGURE 2D) which will imprint a group identification mark beside the numeral 4 at the left of the score sheet 36 (FIGURE 1A). Simultaneously, the activation of relay K14 will close its contacts 1 through 8 and thereby supply the negative voltage from line L5 to pin 9 of plug P31 (FIGURE 2E), which eventually will be transmitted to the car for the test purposes. The use of this negative voltage in association with the car will be discussed presently in conjunction with the operation of the car. The closing of contacts 6 of switches 14 (FIGURE 2B) will activate relay K4 by connecting it to line L4 through the normally closed contacts 3 and 4 of relay K2, contacts b of switch S14, and normally closed contacts 6 and 7 of relay K2. It should be noted that prior to the operation of one of the manual test switches S11 to S18 relays K4 and K5 have not been energized, while relay K6 was energized, being connected at one side to line L5 and at the other side to line L4 through the normally closed contacts 3 and 4 of relay K4. Upon energization of relay K4, its contact 3 will swing away from contact 4 thereby de-energizing the relay K6. Eventually the contact 3 will make connection with contact 5 and thereby supply the positive voltage from line L4 to the coil of relay K5. The relay K5, however, due to its large parallel conected condenser C8 and resistor R10, is not immediately energized. After a time delay required to charge condenser C8 through resistor R10 relay K5 will be energized. The de-energization of relay K6 will re-close its normally closed contacts 3 and 4 and thereby provide positive voltage from line L4 through resistor R12 (FIGURE 2C) and plug P29 to the group printer coils GE1 to GE8 (FIGURE 2D) and scoring coils E1 through E20, etc. (FIGURES 2C and 2D). Upon actuation of relay K5 (FIGURE 2B), its contacts 6 and 8 are conditioned to provide a conduction of positive voltage to actuate the ribbon winding motors E63 or E64 and paper-feed motor E62 when relay K4 is de-energized. Each actuation of paper-feed motor E62 advances the record sheet 36 four vertical spaces so that the armatures of group printer solenoids GE1 through GE8 are always aligned with spaces beside one of the groups of printed numerals 1 through 8 respectively at the left of the record sheet 36 (FIGURE 1A). This positive voltage will be derived from line L4 through contacts 6, 7, 3 and 4 of relay K4 when relay K4 is restored to its de-energized position. Upon release of manual test switch S14, the relay K4 will be de-energized along with group printer coil GE4, relay K14 and any energized one of the scoring coils E1 to E60 simultaneously. While the coil of relay K5 will be separated from its positive power source L4 as soon as relay K4 is de-energized, K5, however, will not be de-energized intantaneously due to the accumulated charge on condenser C8. Here again, K5 will be released after a short time delay. During the short time interval before K5 is de-energized and after relay K4 is de-energized positive power will be supplied from line L4 through contacts 3, 4, 6 and 7 of relay K4 and contacts 6 and 8 of relay K5 to actuate paper-feed motor E62 and ribbon advance motor E63 or E64. Thus, during the printing process on the score sheet 36, the printing paper 36 and ribbons 50 (FIGURE 2C) have been in stationary condition, and the paper and ribbon are advanced as soon as the actuated one of test switches S11 to S18 is released.

The contacts of relays K11–K18 (FIGURES 2C and 2D) are all normally open contacts and the movable contacts 1, 3, 5, 7 and 9 thereof are all connected in common to the negative line L5. The fixed contacts 10 of relays K11–K18 are connected through pins 5, 6, 7, 8, 13, 14, 15 and 16 of plug P15 to the coils GE1–GE8 of the group printer magnets, the opposite sides of which are connected through pin 21 of plug P15, through plug P29 and contacts 3 and 4 of relay K6 which, it will be recalled, is connected to the positive line L4 so long as relay K6 is de-energized. By this arrangement, whenever any one of the relays K11–K18 is energized, the corresponding one of the group printer magnets GE1–GE8 will be energized to record beside the appropriate one of printed numerals 1 through 8 at the left of record sheet 36 (FIGURE 1A) the actuation of that actuator relay and thereby indicate the test group selected and indirectly indicate the control instrumentalities which should be actuated by each individual under test during the interval corresponding to the actuation of that group printer magnet.

The energization of a selected one of the relays K11–K18 establishes the proper control connections to activate the indicators associated with the control instrumentalities in the simulated vehicles to which the test group corresponds and to which the energized relay relates. For this purpose contacts 2 and 4 of relay K11 are connected to pin 1 of plug P31; contact 6 of relay K11 is connected to pin 2 of plug P31, and contact 8 of K11 is connected to pin 3 of plug P31. Contacts 2, 4, 6 and 8 of relay K16 are connected in common to pin 13 of plug P31. Contact 2 of relay K17 is connected to pin 14 of plug P31 and contacts 4, 6 and 8 of relay K17 are connected in common to pin 15 of plug P31. Contact 2 of relay K18 is connected to pin 16 of plug P31 and contacts 4, 6 and 8 of relay K18 are connected in common to pin 17 of plug P31. Pins 19 and 21 of plug P31 are connected to lines L1 and L2 respectively and pin 20 of plug P31 is connected to ground. By this arrangement, when relay K11 is energized, pins 1, 2 and 3 of plug P31 are connected to the negative line L5, when relay K12 is energized, pin 4 of plug P31 is connected to line L5, when relay K13 is energized, pins 5, 6, 7 and 8 of plug P31 are connected to line L5, when relay K14 is energized, pin 9 of plug P31 is connected to line L5, when relay K15 is energized pins 10, 11 and 12 of plug P31 are connected to line L5, when relay K16 is energized pin 13 of plug P31 is connected to line L5, when relay K17 is energized pins 14 and 15 of plug P31 are connected to line L5 and when relay K18 is energized pins 16 and 17 of plug P31 are connected to line L5. Pins 1–21 of plug P31 are connected in common to corresponding pins in the input plugs of all of the simulated vehicles as will be explained presently.

The printing magnets E1–E20 are connected through pins 1–20 of plug P7 to pins 1–20 respectively of plug P32. Pins 1–20 of plug P32 are connected in groups of four to each of five simulated vehicles. That is, pins 1–4 are connected to car 1 for example, pins 5 through 8 are connected to car 2 for example, pins 9–12 are connected to car 3 and so forth. The printing magnets E21–E40 are similarly connected through plug P8 and, plug P33 to cars 6–10 and the printing magnets E41 through E60 are connected through plug P9 and plug 34 to cars 11–15. Thus, four of the printing magnets E1 to E60 are associated with each simulated vehicle. When the circuits of the simulated vehicle are actuated to interconnect one of the pins 1–17 of P31 which has been connected to line L5, the negative side of the D.C. power supply, to one of the associated pins of the plugs P32, P33 or P34, the coil of the associated one of the print magnets E1–E60 will be energized to record, as described at the outset, the actuation of the instrumentality in one of the cars. For example, if cars 1 and 2 are actuated to interconnect pins 1 and 5 respectively of plug P32 to pin 1 of plug P31 while relay K11 is energized, printing magnets E1 and E5 will be energized.

RECORDER OPERATION (AUTOMATIC)

In automatic operation of the recorder, projector power switch S2 (FIGURE 2D) will not be operated. With main power switch S1 on, the test equipment operation is initiated by momentary depression of start switch S3. This, as will be seen later, will supply the required electrical power to the projector 10 and to other components. It should be noted that before start switch S3 is operated, as mentioned before, relays K1, K2 and K3 will not be energized. With relays K1, K2 and K3 de-energized, the positive voltage appearing on line L4 will be applied through normally closed contacts 6 and 7 of relay K3 (FIGURE 2B) to all the contacts 2 to 26 of the wafer L of the stepping switch S5. Hence, if the sliding contact L' of wafer L of switch S5 is not in position 1, the coil E65 of stepping switch S5 will be energized through sliding contact L' and normally closed interrupter contact S22 of stepping switch S5. Interrupter contacts S22 are closed while stepping switch S5 is at rest and are opened during each step of switch S5. Assuming that, when the power is turned on by closing of switch S1 (FIGURE 2D), stepping switch S5 is in a position in which its aligned unitarily rotatable sliding contacts A' through L' are in engagement with their respective fixed contacts 25, coil E65 of switch S5 will be energized by a circuit from line L4, through contacts 7 and 8 of relay K3, fixed contact 25 of wafer L, sliding contact L', interrupter switch S22, coil E65 to line L5. Energization of coil E65 will advance contacts A' through L' to the position 26 and momentarily open switch S22 to de-energize coil E65 and prepare the stepping mechanism (not shown) actuated thereby for the next step. As soon as switch S22 releases a circuit is again completed to coil E65 through fixed contact 26 of wafer L to advance switch S5 to its home position in which contacts A' through L' are engaged with fixed contacts 1 of their respective banks A–L. Since contact 1 of wafer L has no connection, no further energization of coil E65 will occur at this time. In this manner the movable contacts A'–L' of stepping switch S5 are automatically restored to their home positions No. 1.

Simultaneously, the positive power from line L4 will be transmitted through contacts 3 and 4 of the relay K3 to the coil E66 of bank switch S8 (FIGURE 2C) thereby energizing in a sequence of restoring steps through its interrupter switch S8 the bank switch coil E66 if the switch S8 is not at its home position as shown. It can be seen, therefore, that before a test cycle begins, both the stepping switch S5 (FIGURE 2B) and bank switch S8 (FIGURE 2C) are automatically restored to their home positions as shown on the drawing if they were not in their home positions when power switch S1 is turned on.

The film used in association with this equipment is especially prepared to indicate certain time intervals for test purposes and the film provides a signal indicating the start and finish of each test cycle in its sequence of test cycles. This can be accomplished either by a photo-electric arrangement or by simple notches on the edge of the film. For this purpose a switch S20 (FIGURE 2E) is installed with the projector equipment to sense the film notches. A second switch S19 (FIGURE 2E) is arranged to close only in the presence of the film in the projector 10. As will be seen, in the absence of the film in the projector 10 switch S19 will prevent the equipment from operating automatically.

As will be seen, each notch on the film, as sensed by the switch S20, will advance the stepping switch S5 by one step. The wafers A, B, C, D, E, and F of the stepping switch S5 (FIGURE 2B) in conjunction with bank switch S8 (FIGURE 2C), in effect, represent a switch with 132 positions. As each successive film notch is sensed by the switch S20 (FIGURE 2E), the stepping switch S5 will advance by one step thereby scanning wafer A of the switch S5. Upon completion of the scanning of this wafer A, the switch S5 will be in its home position again. While the switch S5 is in home position, its home position indicating switch S21 is closed, thereby allowing the next succeeding closure of notch sensor switch S20 (FIGURE 2E) upon the next film notch to actuate bank switch S8 and advance by one step. One side of coil E66 of bank switch S8 is connected directly to negative line L5. The connection to the other side of coil E66 is through capacitor C6 and resistor R13 in parallel (FIGURE 2B), switch S21, line L11 (FIGURES 2B, 2C, 2D and 2E), switch S20 (FIGURE 2E), line L10 (FIGURES 2E, 2D and 2C), line L8 (FIGURES 2C and 2B), contacts 6 and 8 of relay K2 (now closed as will be explained presently) to positive line L4. Advancement of bank switch S8 by one step, in effect, will transfer the positive voltage from line L12 to line L21 and thereby allow contact B to operatively scan progressively the fixed contacts of bank B of stepping switch S5. Hence, it can be seen that the function of bank switch S8 (FIGURE 2C) is progressively transferring the positive voltage from line L4 (FIGURE 2C) to the sliding contacts A'-F' associated with the wafers A, B, C, D, E and F of stepping switch S5. The manner in which switch S8 is advanced from its illustrated home position to its first position interconnecting lines L4 and L12 will be described presently.

As it was stated before, the automatic operation will be initiated by momentary closure of start switch S3 (FIGURE 2C). This provides positive voltage on line L6 from line L4 momentarily and thereby energizes relays K1, K2 and K3 (FIGURE 2B) in parallel. The closure of contacts 3 and 5 of relay K1 will transmit this positive voltage from line L6 to the line L7, through connector P5 (FIGURE 2C) to the film presence sensor switch S19 (FIGURE 2E). The presence of the film in projector 10 will close switch S19 and transmit the positive voltage on line L7 back through plug P5 (FIGURE 2C) along the line L8 (FIGURES 2E, 2D, 2C and 2B) to the contact 8 of relay K2. Since the relay K2 was energized, and its contact 6, connected to positive line L4, is therefore in contact with its contact 8, the positive voltage from line 4 will be transmitted through contact 6 of relay K2 line L8 (FIGURES 2B, 2C, 2D and 2E), switch S19 (FIGURE 2E) line L7 (FIGURES 2E, 2D, 2C and 2B) now closed contacts 3 and 5 of relay K1 to the coils of relays K1, K2 and K3 in parallel. The other sides of the coils of relays K1, K2 and K3 are connected directly to negative line L5. Hence, the relays K1, K2 and K3 will lock themselves in their energized positions through the film presence sensor switch S19 and the contacts 4 and 6 of K2 and contacts 3 and 5 of K1.

The closure of contacts 6 and 8 of relay K1 will supply the A.C. power from line L2 along the line L3 (FIGURES 2B, 2C and 2D) to the projector socket P2, the socket into which plug P11 (FIGURE 2E) is plugged during automatic operation. The operation of relay K2 (FIGURE 2B) will close its contacts 3 and 5 and open its contacts 3 and 4, thereby removing the actuation function of the relay K4 from the manual test switches S11 through S18 (FIGURE 2B) and obtaining the same function via line L9 from the fixed contacts of wafer H of the stepping switch S5. The closure of contacts 6 and 8 and opening of contacts 6 and 7 of relay K2 will remove positive power from line L4 from manual test switches S11-S18 and supply the same to the wiper H' of wafer H of stepping switch S5 via line L8. The operation of relay K3, by opening its contacts 3 and 4 and its contacts 6 and 7, will remove the positive voltage from line L4 from the homing arrangements previously described for stepping switch S5 (FIGURE 2B) and bank switch S8 (FIGURE 2C).

As it will be seen, the operation of relays K4, K5 and K6 are identical as described above for manual operation.

As it has been indicated before, after the switch S1 has been closed and as the film is inserted in the projector 10, the circuits through the normally closed contacts of relay K3 will restore the stepping S5 (FIGURE 2B) and the bank switch S8 (FIGURE 2C) to their home positions. The wiping arms A'-L' of stepping switch S5 and contact discs of bank switch S8 will be in the positions shown in FIGURES 2B and 2C. The depression of start switch S3 will energize and lock in relays K1, K2 and K3. The first notch on the film sensed by notch sensor S20 (FIGURE 2E) will transmit the positive voltage appearing on lines L8 and L10 (FIGURES 2B, 2C, 2D and 2E) so long as relay K2 is energized along the line L11 (FIGURES 2E, 2D, 2C and 2B) through the plug P5 (FIGURE 2C) to the coil E65 of the stepping switch S5 thereby advancing the movable contacts A' to L' of the same by one step. Since this process was initiated while the stepping switch S5 was in home position, its home position indicating switch S21 was closed and the voltage on line L11 is supplied simultaneously through condensor C6 and resistor R13 to the coil E66 of the bank switch S8, thereby advancing it by one step. By this action of the bank switch S8, the connection from positive line L4 to line L25 is terminated and a connection from positive line L4 to line L12 is established. The advance of the stepping switch S5 will transfer the wiper A' associated with the line L12 to its second position which is marked on the schematic P10—11. This marking indicates that this fixed terminal is connected to the plug P10, terminal 11 (FIGURE 2A). As it can be seen on illustrative program plug, terminal 11 is shorted with a pin 5 of the same plug. Thus, the positive voltage from line L12 will be supplied through the interval connections of the programming plug to the line L17. As discussed in manual operation, positive potential applied to line L17 (FIGURES 2A, 2B, 2C and 2D) will energize relay K15 (FIGURE 2D) representing test group No. 5. Simultaneously, the advance of the wiper H' on the bank H of the stepping switch S5 (FIGURE 2B) will transmit the positive voltage from line L8 through line L9, the now closed contacts 3 and 5 of relay K2 to the coil of relay K4 and thereby energizing relay K4 and K5 and de-energizing relay K6 in exactly the same fashion as described in manual operation. The de-energization of relay K6 will supply voltage to the group printer coils GE1-GE8 (FIGURE 2D) from line L4 via its contacts 3 and 4, resistor R12 (FIGURE 2C), plug P29 and to the score printing coils E1-E60 (FIGURES 2C and 2D).

The equipment remains in this condition until the second notch on the film is momentarily sensed by notch sensor switch S20. Sensing of the second film notch will advance the wipers A'–L' of all the banks A–L of stepping switch S5 to the position 3. The positioning of wiper A' in position 3 on a bank A will disconnect relay K15 from the voltage appearing on line L12 thereby completing the test. The advance of the wiper H' to the third position on the wafer H will remove the voltage from line L8 applied to the coil of relay K4 via line L9 and contacts 3 and 5 of relay K2 thereby de-energizing the same and energizing relay K6 through contacts 3 and 4 of relay K4. The de-energization of relay K5, as described before, will be slightly delayed due to the action of resistor R10 and capacitor C8 and thereby supplying the power from line L4 via contacts 3, 4, 6 and 7 of relay K4 and contacts 6 and 8 of relay K5 to advance the paper and the ribbon by energization of coil E62 and coil E63 or E64. Thus, it can be seen that the functions of the notches on the film will alternate first one to initiate a test or condition the test and the following one to terminate a test for the condition. The capacity of the banks of a stepping switch S5 as shown has a capacity of 67 tests. This capacity as it can be seen, can be extended by utilizing the spare contacts of the switch. Each test film has, of course, different sequence of the test required. This sequence of the test as required for each film is indicated by the programming plug. As it was seen on this particular film which is used as a typical illustrative example, the first test calls for test group No. 5 by energizing relay K15. If, however, pin 11 of the plug P10 were connected to some other terminal 1 to 8 of plug P10, a different test group would have been called. This illustrates the manner in which a different sequence of the test groups can be obtained to correlate the automatic test group selection sequence with the sequence of scenes displayed by the film in the projector 10.

THE SIMULATED VEHICLES

Each of the cars or simulated vehicles perform two separate functions:

(1) To provide a normal car operation as seen by the driver thereby facilitating proper driver reactions.

(2) To provide scoring signals to the associated four of the solenoids E1–E60 in the recorder unit to record what actions have been performed by the driver in response to the sequence of situations visually presented by the projector 10 during automatic operation or to oral instructions during manual operation.

Hereinafter we will refer to these two functions generally as "control functions" and "record functions" respectively.

FIGURES 3A through 3E illustrates the circuit of one of the simulated vehicles which, for simplicity, will be assumed to be car 1. The circuitry of the remaining cars will be identical and the connection (FIGURE 4) of the pins 1–20 of the input plug VP2 (FIGURE 3F) to the pins 1–17 and 19–21 of plug P31 (FIGURE 2E) of the control unit will be identical for all cars. Pins 21–24 of plug VP2 of car 1 (FIGURE 3F) will be connected to pins 1–4 of plug 32 (FIGURE 2E) of the control unit, pins 21–24 of plug VP2 of car 2 (FIGURE 4) will be connected to pins 5–8 of plug P32 (FIGURE 2E) of the control unit and so forth.

Control Functions

Referring to FIGURES 3A–3F, each car is supplied with A.C. power through its plug VP2 (FIGURE 3F), contacts 18 and 20, and conducted along the lines L1 and L2 to the safety switch S20 (FIGURE 3F) and the fuse F1 (FIGURE 3E) to the primary of transformer T1 (FIGURE 3A). As is shown in FIGURE 4, pins 18 and 20 of plug VP2 are connected through a junction box to the lines from pins 19 and 21 of plug P31 which, as indicated in FIGURE 2E, are connected to the A.C. power lines L1 and L2 from plug P1 (FIGURE 2D). Whenever power is switched on in the recorder unit by closure of switch S1 (FIGURE 2D), the dash light LT1 on the car (FIGURE 3A) will be energized, being connected across lines L1 and L2. The operation of the ignition switch VS7 (FIGURE 3C) to the start position provided thereby making momentary contact on terminal 1 will energize relay VK4 (FIGURE 3A) by passing the power along the lines VL10 and VL9 through the contact 13 of plug VP6 (FIGURE 3B) provided "Auto Neutral Switch" (FIGURE 3C) is in neutral position. Relay VK4 will self-lock itself through its own contacts 1 and 2 upon momentary energization of the same obtaining the power through the pin 8 of the plug VP6 (FIGURE 3B) through the "Stall" switch VS9 (FIGURE 3C) and ignition switch VS7 "on" position which is identified by number 2. Ignition switch VS7 is constructed so that its movable arm by be rotated into contact with terminal 1 but upon release of manual pressure it will restore to engagement with its contact 2 and remain in that position until turned off manually. In this self-locking path the relay VK4 will lock itself in energized state. The energization of relay VK4 (FIGURE 3A) in any of the cars will render that car operative. Its engine is "on." The self-locking action of relay VK4 (FIGURE 3A) can be interrupted and freely de-energized either by switching the engine off with the ignition key (turning VS7, FIGURE 3C, to position 3) or "stalling" the car through the control switch VS9 (FIGURE 3C) as will be explained presently. The contacts 11 and 12 of relay VK4 (FIGURE 3A), upon energizing the same, will extinguish the generator light LT2 (FIGURE 3A) by opening the connection to it from the ungrounded end of the secondary winding of transformer VT1 (FIGURE 3A). The closure of the contacts 3 and 4 of the relay VK4 will supply A.C. power from line L1 (connected to its contact 4) through the contact 16 of plug VP6 (FIGURE 3B) to terminal 4 of the engine sound simulator (FIGURE 3C), its terminal 3 being connected directly to line L2 through pin 6 of plug VP6 (FIGURE 3B). The voltage across the secondary of the transformer VT1 is 6.3 volts. This voltage is supplied to contact 12 of relay VK4, through the contact 12 of the plug VP6 (FIGURE 3B) to terminal 4 and the movable arm of the directional light switch VS13 (FIGURE 3C). Upon actuation of this switch VS13 to its terminal 1 or its terminal 3, this A.C. voltage will be supplied through the contacts 10 or 11 respectively of plug VP6 (FIGURE 3B) to the coils of relays VK2 or VK3 respectively (FIGURE 3A), thereby energizing one of them and activating the directional lights LT4 or LT3 connected in parallel therewith. The contacts of relay VK3 and VK2, as it will be seen in separate consideration, will provide the scoring voltage to the recorder (FIGURES 2A–2E) to recognize this action.

The activation of the horn switch VS8 (FIGURE 3C) will supply the return connection from ground through the pin 9 of plug VP6 (FIGURE 3B) to the horn relay VK1 (FIGURE 3A), thereby activating the same. The closure of its contacts in turn will supply the scoring signal to the recorder (FIGURES 2A–2E) required to identify this action.

Upon ignition of the car, the relay VK5 (FIGURE 3C) in the engine sound simulator will be energized by the voltage applied to terminals 3 and 4, as previously described, and close its contact to activate the motor sound box. The motor sound is simulated utilizing an oscillator activated loud speaker. The loudness of this oscillator sound will be controlled by mechanical coupling to the accelerator pedal (FIGURE 3A) as will be explained presently.

The car is equipped with both a simulated manual gear shift arrangement and a simulated automatic gear shift arrangement, thus providing a choice for instructional and test purposes. The switch-over function between these two arrangements is accomplished utilizing a twelve pole double-throw switch designated as VS6 (FIGURE 3D). This switch VS6 is actuated by mechanical means to connect the circuit to simulate either a manual gear shift or an automatic transmission equipped vehicle. The switch VS6, as shown, is in the manual gear switch operation position which will be used for illustrative description purposes.

The 115 volts A.C., as available on line L1, will be transmitted through pin 21 of plug VP6 (FIGURE 3B) to the sliding arms of sections VC2 and VC1 of the foot brake switch VS11 (FIGURE 3D). The foot brake switch VS11 is shown in its position representing no brake action. In the position of switch VS11 shown, the A.C. power will be transmitted through its section VC2 to th sliding arm of the section VC1 on the clutch switch VS12 (FIGURE 3D). The clutch switch VS12 is shown in its up or engaged position. This power will be transmitted through the pin 7 of the plug VP3 (FIGURE 3D) and the section B3 of the switch VS6 through the contact 7 of VP4 (FIGURE 3C) to the sliding arm of section VC1 of the switch VS4 (FIGURE 3C). The switches VS4 and VS5 as shown represent the gear in its neutral position.

The speedometer (FIGURE 3A) of the car is represented by a mechanical needle (not shown) being advanced and returned by a bi-directional motor VE1 (FIGURE 3A). The deflection of the speedometer needle is quantitatively controlled by the position of accelerator cam X1. Cams X1, X2 and X3 are mechanically connected to and poistioned by the rotor of motor VE1. Energization of the right hand half of the field winding of motor VE1 will rotate cams X1, X2 and X3 in a counterclockwise direction as indicated by the arrows thereon. Energization of the left hand half of the field winding of motor VE1 will rotate cams X1, X2 and X3 clockwise in directions opposite to the arrows thereon. Switches S16 and S17 are mounted for rotation about the axes of cams X1, X2 and X3 respectively mechanically independently of the rotation of cams X1, X2 and X3 by the motor VE1. Switch S19 is stationary. The rotation of switches S16 and S17 is controlled by depression of the accelerator pedal. Depression of the accelerator pedal will rotate switches S16 and S17 counterclockwise about cams X1 and X2 respectively. Upon release of pressure upon the accelerator pedal, switches S16 and S17 will rotate in a clockwise direction.

Whenever the manual gear switches VS4 and VS5 (FIGURE 3C) are set either to first gear, second gear or third gear, the 115 A.C. voltage from line L1 on the sliding arm of section VC1 of switch VS4 (FIGURE 3C) will be forwarded through the pin 10 of the plug VP4 through the section A2 of the switch VS6 (FIGURE 3D) and the pin 10 of plug VP3 through the pin 2 of the connector VP6 (FIGURE 3B) to the contact 10 of the relay VK4 (FIGURE 3A) which, being energized, will transmit this voltage from contact 9 of relay VK4 to terminal 1 of resistor VR3 (FIGURE 3A). Since the center tap in the field winding of motor VE1 (FIGURE 3A) is connected to line L2, the portion of the resistor VR3 between terminals 1 and 2 and the right hand half of the winding of motor VE1 will be connected in series with the A.C. voltage across lines L1 and L2 through the switch S16 which is closed upon application of foot pressure to the accelerator pedal by rotation of switch S16 relative to cam X1 in a counterclockwise direction, an amount proportional to the pedal depression. This will activate motor VE1 to rotate cams X1, X2 and X3 in a counterclockwise direction until switch S16 re-opens. Switch S17 will remain open and switch S19 will be closed as cam X3 rotates in a counterclockwise direction.

The speed of the motor VE1 is controlled by selectively connecting various portions of resistors VR3, VR2 and VR1 in series with the windings of motor VE1 as will be explained.

The ultimate excursion of the speedometer needle and the rotor of motor VE1 will thus be controlled by and be proportional to the magnitude of depression of accelerator pedal. Upon removal of the accelerator pedal depression pressure, the switches S16 and S17 will return into the positions shown and thereby close the switch S17 which will connect the 115 volts A.C. appearing on contact 9 of VK4 through the portion of the resistor VR2 between terminals 1 and 4 thereof, through the closed switch S19 and the left hand half of the winding of motor VE1 to cause motor VE1 to rotate in the reverse direction until the rotation of the cams X1, X2 and X3 in the opposite direction to that shown by the arrows will open switches S17 and S19.

This described deceleration was effected without any consideration of the brake application. The application of the soft pressure to the foot brake will advance the slider of the section VC2 of the foot brake switch VS11 (FIGURE 3D) by one position and thereby supply the A.C. voltage from line L1 through the pin 3 of plug VP6 (FIGURE 3B) to the resistor VR2, terminal 3. This will decrease the resistance value of the portion of resistor VR2 in series with the left hand winding of motor VE1 and thereby brake and return the speedometer needle toward zero at a faster rate than without brake pressure. Medium brake pressure will connect line L1 through section VC2 of switch VS11 (FIGURE 3D), pin 4 of plug VP6 (FIGURE 3B) to terminal 12 of resistor VR1. Hard brake will connect line L1 through section VC2 of switch VS11 (FIGURE 3D) and pin 1 of plug VP6 (FIGURE 3B) to terminal 2 in resistor VR2 (FIGURE 3A). Therefore, considering the degree of brake application at switch VS11 (FIGURE 3D), it can be seen that deceleration rate will be effected by the degree of brake application and controlled by different resistance values from resistors VR1 and VR2. The decelerator with the gear in neutral position will be effected in similar fashion except with a power applied to the terminal 3 of the resistor VR1 by connection to line L1 from section VC2 of switch VS11 (FIGURE 3D), through section VC1 ("up" terminals) of switch VS12, pin 7 of plug VP3, section B3 of switch VP3, pin 7 of plug VP4 (FIGURE 3C) terminals "N" of sections VC1 of switches VS4 and VS5, pin 11 of plug VP4, section B1 of switch VS6, pin 11 of plug VP3 (FIGURE 3D), and pin 17 of plug VP6 (FIGURE 3B). It can be seen that the same deceleration rate will be obtained with a clutch switch VS12 being disengaged (clutch pedal down), by a connection to line L1 through section VC2 of switch VS11 (FIGURE 3D), section VC1 of switch VS12 (down position), pin 8 of plug VP3, section A3 of switch VS6, pins 8 and 11 of plug VP4 (FIGURE 3C) section B1 of switch VS6 (FIGURE 3D), pin 11 of plug VP3, and pin 17 of plug VP6 (FIGURE 3B). This connection is controlled by the section VC1 of the switch VS12.

The partial application of the clutch pedal controlling the switch VS12 (FIGURE 3D) will position the sliding arm of section VC1 on the terminal marked as "FP" for friction point which will supply, from line L1 through section VC2 of switch VS11, section VC1 of switch VS12, the power to the friction point vibrator VK8 (FIGURE 3D) and thereby provide a slight vibration feeling on the clutch pedal.

*Recording Functions*

For score recording purposes each car under test is assigned four actuators or recording solenoids, such as E1, E2, E3 and E4 (FIGURE 2C) for car No. 1, etc. At any given time, corresponding to the film situation, as controlled by the recorder mechanism (FIGURES 2A–2E) discussed previously, one of eight test groups will be interrogated by the selective energization of one of the relays K11–K18 (FIGURES 2C and 2D). As indicated before, the recorder solenoids GE1–GE8 (FIGURE 2D) are actuated to record the selection of test groups 1 to 8 respectively by the action of relays K11 to K18 respectively. In each test group there are always four tests specified. For each of those four tests specified within the selected test group, one of the four actuator coils connected to each car is assigned. Thus, the actuated one of solenoids GE1–GE8 would specify test group and the actuated ones of the solenoids associated with each car, E1 to E4, for example, specify the tests within a selected group. The certain reactions of the driver can thus be exactly identified.

As indicated, the connection to the negative line L5 of pins L–17 of plug VP2 (FIGURE 3F) is under control of relays K11–K18 (FIGURES 2C and 2D), pins 1–3 of plug VP2 being controlled by K11, pin 4 by K12, pins 5–8 by relay K13, pin 9 by relay K14, pins 10–12 by relay K15, pin 13 by relay K16, pins 14 and 15 by relay K17 and pins 16 and 17 by relay K18.

The energization of any of relays K11–K18 effects selection of a predetermined test group. Each test group has four elements which will be recorded by the application of the negative potential of line L5 to one of the pins 21–24 connected to the printing magnets (E1–E4 for car 1). Energization of relays K11–K18 establish the conditions for test group 1–8 respectively. In test group 1 the four elements recorded through pins 21–24 respectively of plug VP2 are "clutch up," "clutch down," "start" and "neutral." In test group 2 the four elements are "first gear," "second gear," "third gear" and "reverse." In test group 3 the four elements are "accelerator down," "no stall," "friction point" and "hand brake." In test group 4 the four elements are "soft brake," "medium brake," "hard brake" and "brake pump." In test group 5 the four elements are "hard brake," "left steering," "right steering" and "horn." In test group 6 the four elements are "accelerator up," "accelerator ¼–½," "accelerator ½–¾" and "accelerator ¾-full." In test group 7 the four elements are "right signal," "slight right," "medium right" and "full right." In test group 8 the four elements are "left signal," "slight left," "medium left" and "full left."

Selection of any one of the eight test groups establishes connections from line L5, through the contacts of the operated one of relays K11–K18 and the connected pins of plug VP2 to condition the switch indicators associated with the instrumentalities which should be operated so that if those instrumentalities are properly manipulated the associated switches will establish through connections to the appropriate recording magnet coils E1–E40.

For this purpose, for example, pin 1 of VP2 (FIGURE 3F) is connected through a line VL1 to the movable arm of section VTG1 of the clutch position indicator switch VS12 (FIGURE 3D). When the clutch is up, the movable arm of section VTG1 of switch VS12 is connected through line VL2 and VL3 to pin 21 of plug VP2 (FIGURE 3F) to record magnet E1 (FIGURE 2C). Thus, when relay K11 (FIGURE 2C) is energized, record printing magnet E1 will be energized if the clutch is up in car 1. If the clutch is down in car 1 while relay K11 is energized, the movable arm of section VTG1 of switch VS12 will be connected through line VL4 contacts a and c of section A1 of the manual automatic transmission selector switch VS6, through line VL5 to line VL6 connected to pin 22 of plug VP2 (FIGURE 3F) to energized printing magnet E2 (FIGURE 2C).

Similarly, pin 2 of plug VP2 (FIGURE 3F) is connected by a line VL7 to pin 23 of plug VP6 (FIGURE 3B) to the normally open contact 8 of energized relay VK4 (FIGURE 3A).

With relay VK4 energized, lines VL8 and VL11 are interconnected through normally open contacts 7 and 8. Line VL11 is connected through pin 15 of plug VP6 (FIGURE 3B) to lines VL12 and VL13 to pin 23 of plug VP2 (FIGURE 3F) to energize the print magnet E3 (FIGURE 2C).

Pin 3 of plug VP2 is connected through line VL14 and line VL15 to the movable arm of section VTG1 of manual gear shift switch VS5. When in "neutral," line VL16 is connected to the neutral fixed terminal of section VTG1 of switch VS5 (FIGURE 3C), the movable arm of section VTG1 of manual gear shift switch VS4 when in "neutral," its neutral fixed terminal, line VL17, pin 2 of plug VP4, line VL17, pin 2 of plug VP4, line VL18, contacts a and c of section A6 of switch VS6 (FIGURE 3D), line VL19, pin 2 of plug VP3, line VL20, and line VL21 to pin 24 of plug VP2 (FIGURE 3F) to energize the printing magnet E4 (FIGURE 2C).

If the manual gear shift is not in neutral the sections VTG1 of manual gear shift switches VS5 and VS4 (FIGURE 3C) will not be in engagement with the "neutral" fixed contacts so that the circuit to pin 24 from pin 3 of plug VP2 (FIGURE 3F) will be open and no record will be made by printing magnet E4 (FIGURE 2C).

In order to simplify the explanation and understanding of the recording arrangement, reference is made to the simplified schematic indicated in the recording arrangement, FIGURE 5.

As we have seen before, one of the relays K11 through K18 is energized, depending upon the test group to be tested. For description purposes, let's assume that test group 5 is called and hence relay K15 is energized thereby closing all its contacts. It should be noted that the test group 5 will interrogate the following functions: hard brake, left steering, right steering and horn. The closure of contacts 9 and 10 of relay K15 will supply a negative voltage for actuation of the group printer coil GE5 as explained previously. The closure of contacts 7 and 8 will provide a negative voltage through pins 12 of plugs P31 and VP2 to the movable arm of section VTG5 of the foot brake switch VS11. Thus, whenever the foot brake is depressed to hard position, this negative voltage will be transmitted through the contacts identified as hard into return bar A, which in turn, will transmit this negative voltage back to the recorder through pins 24 and 4 of plugs VP2 and P32 respectively, into the scoring actuator E1 thereby causing it to be energized and printing the score mark on a score sheet 36 (FIGURE 1A). The closure of contacts 3, 4, 5 and 6 of the relay K15 will supply the negative power through pins 11 of plugs P31 and VP2 to the sliding arm of the steering switch S14. If the steering would be rotated to the left side, the negative voltage would be supplied to the scoring bar B and simultaneously transmit it through pins 3 and 23 of plugs P32 and VP2 respectively to the printing actuator E2. Right steering will establish a connection through scoring bar C, and pins 22 and 2 of plugs VP2 and P32 to actuator E3. The closure of the contacts 1 and 2 of the relay K15 will similarly supply the negative voltage through pins 10 of plugs P31 and VP2 to the contacts of the horn relay K1 which, upon closure, will supply this negative voltage to the scoring bar identified as D and, in turn, transmit this actuating voltage through pins 1 and 21 of plugs P32 and VP2 to the scoring actuator E4. Thus, it has been seen that if any of the four actions have been performed in the test interval by the driver, the same action would be recorded by the scoring actuators. It should also be noted, from the connections on the relay K15, that for each of the four tests there is one contact available leading to appropriate control switch in the car. If, however, two or more tests are satisfied by a single control section of a switch, such as left or right steering, those two contacts are joined. Subsequently, an event could be analyzed whereby test group 4 is required. For this purpose relay K14 is energized. This test interrogates the following functions: soft brake, medium brake, hard brake and brake pump. Since all four tests within the test group 4 can be obtained from a single section VTG4 of the switch VS11, but one conductor through pins 9 of plugs P31 and VP2 is used to supply this voltage from the relay K14. Here again, dependent on the position of the brake pedal and its switch S11, this voltage will be supplied to one of the A, B, C or D score bars which will actuate in turn the appropriate one of the scoring actuators, E1–E4 for car No. 1.

With the foregoing by way of examples, and from the detailed disclosures embodied in FIGURES 3A–3F, it is clear that energization of relays K11–K18 will establish connections through the circuit through the control indicator switches, such as horn switch VS8 (FIGURE 3C), hand brake switch VS10, direction light switch VS13, foot brake switch VS11 (FIGURE 3D), steering switches VS14 (FIGURES 3D and 3E), acceleration switch VS15 (FIGURE 3E), manual gear shift switches VS4 and VS5 (FIGURE 3C), automatic transmission selector switch VS21 (FIGURE 3E), etc. corresponding to the element of the various test groups as above described to condition those indicator switches for actuation of the printing magnets E1–E4 if the associated control instrumentality by which the indictaor switches are moved are properly manipulated for the control group established by the selective energization of relays K11 through K18.

In FIGURE 3E can be seen a number of diodes. The purpose of these diodes can be and will be explained utilizing FIGURE 5. Let's assume that test group 5 is being interrogated with K15 energized. Assuming that all diodes shown in FIGURE 5 were omitted and straight connections substituted, it can be seen that whenever the steering actuator is turned to the right thereby making a contact in switches 14 and providing negative voltage to the bar C, this voltage would be transmitted to the section VTG4 of switch S11. It should be noted that the switches used in this equipment have contacts of shorting type, that is, they make before break. Thereby, there is a possibility that foot brake could have been actuated at the same time shorting two contacts simultaneously. For instance, the one indicating hard brake and medium brake thereby passing this negative voltage to bar B which eventually would show scoring mark by energization of recorder coil E2. Considering this test of the test group 5, a score on E2 could be interpreted as left steering, which, of course is not true, since actually we had assumed right steering. In order to prevent such an occasional mis-representing of the actual score, a number of blocking diodes, as shown in FIGURES 5 and 3E, have been inserted to prevent the passage by so-called back circuits of this negative voltage to the switches not involved in the particular selected test and thereby preventing wrong scoring.

Referring to FIGURE 4, it can be seen that disregarding the number of cars, the number of wires used for interrogation purposes from the recorder is always constant and shared by all the cars. The increase of the number of test cars would mean only the addition of four scoring wires from the car to the recorder.

In summary therefore, in automatic operation as the motion picture scene is displayed before the operators being tested as they are seated in the simulated vehicles, the succession of sequences, each requiring actuation during normal driving of certain control instrumentalities of the vehicle, will be presented to the vehicle operator. Each scene sequence will require actuation of the control instrumentalities in one of the above described test groups. The test groups may be required in any order and any number of times depending upon the nature of the scene sequences. The program plug (FIGURE 2A) is pre-wired so that the actuator relays K11–K18 (FIGURES 2C and 2D) will be energized in the proper sequence for correlation with the scene sequences being displayed, the timed relation of actuation of relays K11–K18 being determined by the sensor switch S20 (FIGURE 2E) and its actuation of the stepping switch S5 (FIGURE 2B) and the bank switch S8 (FIGURE 2C).

A separately wired program plug will normally be provided for each film sequence so that when the operator wishes to operate the apparatus, he selects a particular film and the corresponding program plug, places the film in the projector and the program plug in plug P10 (FIGURE 2A) and then starts the unit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims is therefore intended to be embraced therein.

What is claimed and desired to be secured by United States Letters Patent is:

1. In a vehicle operator group testing and training device, a plurality of simulated vehicles each having a like set of distinct operator manipulatable vehicle control instrumentalities, an indicator connected to and actuated by each such instrumentality to provide an indication of the mode of operation of the associated instrumentality, a common electrical interconnection among the like instrumentality indicators of each set, and a plurality of actuators located solely in a central control unit distinct from said simulated vehicles, each actuator being connected to at least one of said such electrical interconnections for activating all of the indicators connected thereto simultaneously.

2. The combination defined in claim 1 wherein the ones of said interconnections associated with functionally correlated ones of said instrumentalities are connected to a common one of said actuators.

3. In a vehicle operator group testing and training device, a plurality of simulated vehicles each having a like set of distinct operator manipulatable vehicle control instrumentalities, an indicator connected to and actuated by each instrumentality to provide an indication of the mode of operation of the associated instrumentality, a common electrical interconnection among the like instrumentality indicators of each set, a plurality of actuators located solely in a central control unit distinct from said simulated vehicles, each actuator being connected to at least one of such electrical interconnections for activating all of the indicators connected thereto simultaneously, means for displaying a varying scene simulating vehicle motion and embodying a succession of scene sequences each requiring manipulation of certain of said control instrumentalities, means controlled by said displaying means for generating a succession of signals each indicative of a change of scene sequence, and means controlled by said succession of signals for actuating said actuators in a sequence correlated to the change of said scene sequences to activate during such scene sequence the instrumentality indicators associated with the instrumentalities which should be manipulated during such scene sequence.

4. The combination defined in claim 3 wherein said actuator activating means embodies a selective variable program unit whereby the sequence of actuator actuation can be varied to accommodate scenes of various scene sequences.

5. The combination defined in claim 3, wherein said actuators are independently operable, two position switching devices.

6. In a vehicle operator group testing and training device, a plurality of simulated vehicles each having a like set of distinct operator manipulatable vehicle control instrumentalities, an indicator connected to and actuated by each such instrumentality to provide an indication of the mode of operation of the associated instrumentality, a common electrical interconnection among the like instrumentality indicators of each set, a plurality of actuators located solely in a central control unit distinct from said simulated vehicles, each actuator being connected to at least one of said electrical interconnections for activating all of the indicators connected thereto simultaneously, a set of recording devices for each simulated vehicle, and means connecting each recording device of each set to at least one of the indicators of the associated simulated vehicles for actuation thereby when said one indicator is activated by the associated actuator and the associated instrumentality is properly manipulated by the operator.

7. In a vehicle operator group testing and training device, a plurality of simulated vehicles, each having a like set of operator manipulatable vehicle control instrumentalities, each set comprising at least first and second instrumentality types, an indicator connected to and actuated by each such instrumentality to provide an indication of the mode of actuation of the associated instrumentality, a central control unit distinct from said simulated vehicles including at least first and second independently operable actuators located solely in said central control unit, means connecting said first actuator in common to each of said first instrumentality type indicators, and means connecting said second actuator in common to each of said second instrumentality type indicators whereby the indicators associated with each type of control instrumentality in all of said simulated vehicles can be actuated simultaneously.

8. In a vehicle operator group training and testing device, a plurality of simulated vehicles each provided with at least a first type of operator manipulatable vehicle control instrumentality, indicator means associated with and actuated by each said instrumentality to indicate the mode of operation of the associated instrumentality, a control unit distinct from said simulated vehicles, an actuator located solely in said control unit, and means connecting said actuator in common to all the indicating means associated with all of the instrumentalities of said first type in all of said simulated vehicles to simultaneously activate all of said indicating means associated with said first type instrumentalities when said actuator is rendered operative.

9. A device for testing and recording the ability of a person to manipulate the control instrumentalities of a vehicle in response to simulated driving conditions, said device comprising at least one simulated vehicle having a plurality of control instrumentalities selectively actuatable by a person being tested, means for presenting to such a person preselected sequence of scenes giving the illusion that the simulated vehicle is traveling over a course, such scene sequence presenting a predetermined succession of situations at least certain ones of which require actuation by such person of predetermined ones of said control instrumentalities, a circuit device operatively associated with each such control instrumentality to produce a signal, a plurality of recording devices, circuit means connecting each of said circuit devices to one of said recording devices, a central control unit distinct from said simulated vehicle, said unit having means including a plurality of independently operable, two position switching devices in said control unit each connected when operated to render predetermined ones of said circuit devices operable for signal transmission to a connected one of said recording devices for extending the control of said central control unit to additional simulated vehicles without increasing the number of connections to said control unit, and means controlled by said scene presenting means for activating said switching devices in a selectively variable pre-selected sequence correlated with the predetermined succession of situations such that the circuit devices associated with the predetermined control instrumentalities which should be actuated during each situation are rendered operable by said switching devices during the display of each situation.

10. The combination defined in claim 9, wherein said switch device activating means comprises a first multi-bank stepping switch operatively connectable to said switching devices and operable through a plurality of steps to a home position; and means including a second stepping switch operable when said first stepping switch reaches said home position to operatively connect succeeding ones of said banks to said switching devices.

11. The device defined in claim 9 wherein said switching device activating means embodies a selectively variable program unit.

12. The device defined in claim 11 wherein said program unit comprises a connection to each of said switching devices, a plurality of coonnections controlled by said scene presenting means, and means providing preselected interconnections between said switching device connections and said scene presenting means controlled connections.

13. The device defined in claim 12 wherein said interconnection providing means comprises a prewired program plug.

References Cited in the file of this patent
UNITED STATES PATENTS

| | | |
|---|---|---|
| 2,870,548 | Chedister | Jan. 27, 1959 |
| 3,015,169 | Chedister et al. | Jan. 2, 1962 |